US005879949A

United States Patent [19]

Cole et al.

[11] Patent Number: 5,879,949

[45] Date of Patent: Mar. 9, 1999

[54] APPARATUS AND METHOD FOR RAPID ON-LINE ELECTROCHEMISTRY AND MASS SPECTROMETRY

[75] Inventors: Richard B. Cole, New Orleans; Xiaoming Xu, Metairie, both of La.

[73] Assignee: Board of Supervisors of Louisiana State University & Agricultural and Mechanical College, Baton Rouge, La.

[21] Appl. No.: 746,712

[22] Filed: Nov. 15, 1996

Related U.S. Application Data

[60] Provisional application No. 60/112,012 Nov. 22, 1995.

[51] Int. Cl.[6] .......................... G01N 24/00; B01D 59/44; H01J 49/00

[52] U.S. Cl. ....................... 436/173; 250/288; 422/82.01; 422/100; 436/139; 436/140

[58] Field of Search .................................... 250/282, 288; 436/173, 139–140; 422/100, 68.1, 82.01

[56] References Cited

U.S. PATENT DOCUMENTS 5,223,226 6/1993 Wittmer et al. ......................... 422/100

OTHER PUBLICATIONS

K.J. Volk et al, *Anal. Chem*, 1988, 60, 720–722.
T.A. Getek et al, *J. Chromatogr.* 1989, 474, 245–256.
H. D. Dewald et al, *Electroanalysis* 1991, 3, 777–782.
P.A. Limbach et al, *Internat. J. Mass Spectrom. Ion Process*, 1993, 125, 135–143.
G. Hambitzev et al, *Synth. Met.* 1993, 55, 1317–1322.
L. Fang et al, *Anal. Chem.* 1994, 66, 3696–3701.
A. Dupont et al, *Tetrahedron Lett.* 1994, 35, 6083–6086.
C.E.C.A. Hop et al, *J. Am. Soc. Mass Spectrum.* 1995, 6, 860–865.

*Primary Examiner*—Arlen Soderquist
*Attorney, Agent, or Firm*—John H. Runnels

[57] ABSTRACT

An electrochemical cell is coupled on-line with a mass spectrometer to achieve minimal response time in a system called rapid electrochemical-mass spectrometry (EC/MS). Many large, nonpolar compounds that could not be analyzed by prior ES/MS techniques may now be analyzed. Ionic and polar intermediates and products generated by electrochemical reactions may be probed with very short response times prior to their analysis. Ions are generated by electrochemical oxidation or reduction immediately prior to electrospray release, pneumatic nebulization, or outlet heating. The on-line coupling of an electrochemical cell to electrospray mass spectrometry permits the fast identification of ionic intermediates (both radicals and non-radicals), as well as products generated from electrochemical reactions and from ensuing solution-phase reactions. Neutral compounds that are otherwise difficult to analyze by ordinary electrospray mass spectrometry may now be analyzed. Preferred three-electrode cells are disclosed.

24 Claims, 17 Drawing Sheets

Response Time (sec)
4.0
3.5
3.0
2.5
2.0
1.5
1.0
0.5
0.0
0
2
4
6
8
Flow Rate (μL/min)

Ion Abundance
70000
60000
50000
40000
30000
20000
10000
0
0
2
4
6
8
Flow Rate (μL/min)

$$DPA^{+\cdot} + py \longrightarrow DPA(py)^{\cdot +}$$
m/z=409

$$DPA(py)^{\cdot +} + DPA^{\cdot +} \rightleftharpoons DPA\,(py)^{2+} + DPA$$
m/z=204.5

$$DPA\,(py)^{2+} + py \rightleftharpoons DPA(py)_2^{\,2+}$$
m/z=244

Fig. 10(a)

$$DPA^{+\cdot} + DPA^{+\cdot} \rightleftharpoons DPA^{2+} + DPA$$
m/z=165

$$DPA^{2+} + py \rightleftharpoons DPA\,(py)^{2+}$$
m/z=204.5

$DPA\,(py)^{2+} \longrightarrow$ further reaction

Fig. 10(b)

APPARATUS AND METHOD FOR RAPID ON-LINE ELECTROCHEMISTRY AND MASS SPECTROMETRY

The development of this invention was partially funded by the Government under grant (1994)-RCD-05 awarded by the National Science Foundation. The Government may have certain rights in this invention.

The benefit of the Nov. 22, 1995 filing date of provisional application Ser. No. 60/112,012 (which was a conversion of nonprovisional application Ser. No. 08/682,337) filed on Nov. 22, 1995, is claimed under 35 U.S.C. §119(e).

This invention pertains to a method and apparatus for combining electrochemical techniques with mass spectrometry, either for analytical purposes or to probe electrochemical reaction mechanisms.

Electrochemical reactions, or oxidation-reduction reactions, are ubiquitous in industrial processes, organic and inorganic chemistry, and the chemistry of many important biologically active compounds. An oxidation-reduction, or "redox," reaction, is a reaction in which one chemical species is "oxidized," i.e., it loses one or more electrons; and another chemical species is "reduced," i.e., it gains one or more electrons. The application of an electric potential to an electrochemical cell can promote redox reactions of species present in the cell.

Identifying intermediates and reaction products of electrochemical reactions is important not only in understanding reaction mechanisms, but also in practical analytical applications such as electrochemical detection in liquid chromatography and capillary electrophoresis. The more stable reaction products of electrode processes can be isolated and analyzed off-line by instrumental techniques such as gas chromatography-mass spectrometry (GC-MS); and nuclear magnetic resonance. However, the analysis of shorter-lived intermediates and reaction products of electrochemical processes has been more difficult, and the techniques available for such analyses are limited.

To analyze shorter-lived species, efforts have been made to couple electrochemistry on-line with various analytical techniques, including mass spectrometry (MS); electron paramagnetic resonance (EPR); and traditional spectroscopic techniques, including ultraviolet, visible, or infrared absorbance, and Raman spectroscopy. Mass spectrometry in particular has the advantages of high sensitivity and specificity.

In mass spectrometry, a compound is ionized, and the mass to charge ratios (m/z) of the resulting ions (including fragments of the compound) are measured. From the values and relative abundances of the m/z ratios of ions arising from a particular analyte, one may make inferences regarding the composition and structure of the analyte.

In the more recent technique of "electrochemical mass spectrometry" (EC/MS), an electrochemical cell is coupled on-line with a mass spectrometer. EC/MS allows the relatively rapid identification of electrochemically generated species. EC/MS has become a useful tool in electroanalysis and in electrochemical kinetics studies. EC/MS has found applications in areas such as electrocatalysis, electrosynthesis, batteries, chemical sensors, and corrosion.

Measuring electrochemical reaction products by coupling an electrochemical cell on-line with a mass spectrometer was first suggested by S. Bruckenstein et al., "Use of a Porous Electrode for In Situ Mass Spectrometric Determination of Volatile Electrode Reaction Products," J. Am. Chem. Soc., vol. 93, pp. 793–794 (1971). In this and other earlier references, a porous working electrode or a permeable membrane was usually used as an interface between the electrochemical cell and the mass spectroinetry (MS) ionization source. By optimizing a differential, multiple-stage pumping system, the signal response time could be lowered from about 20 seconds to about 50–200 ms.

See generally L. Grambow, "Mass Spectrometric Investigation of the Electrochemical Behavior of Adsorbed Carbon Monoxide at Platinum in 0.2M Sulphuric Acid," Electrochimica Acta, vol. 22, pp. 377–383 (1977); O. Wolter, "Differential Electrochemical Mass Spectroscopy (DEMS) —A New Method for the Study of Electrode Processes," Phys. Chem., vol. 88, pp. 2–6 (1984); and T. Brockman et al., "Permeable Membrane Mass Spectrometry of Products of Electrochemical Oxidation of Carboxylate Ions," Anal. Chem., vol. 56, pp. 207–213 (1984).

S. Wasmus et al., "Reduction of Carbon Dioxide to Methane and Ethene—An On-line MS Study with Rotating Electrodes," Electrochimica Acta, vol. 35, pp. 771–775 (1990) developed a method in which a compact working electrode in the form of a rotating cylinder or disc was placed very close (about 0.3 mm) to the poly (tetrafluoroethylene) membrane of the mass spectrometer inlet. This device was reported to have higher mechanical stability than porous electrodes, and thus to be useful to study electrode reactions that are accompanied by strong gas evolution.

S. D. House et al., "Mass Spectral Analysis of Electrochemical Products Generated Directly within the MS Source Vacuum," Anal. Chem., vol. 66, pp. 193–199 (1994) reported a different approach to coupling an electrochemical cell with a mass spectrometer. Poly(ethylene glycol) (PEG) or hexamethylphosphoric triamide was used as a solvent, and a cell containing an interdigitated electrode pair, one side of which was coated with "Prussian blue," acted as an auxiliary/pseudoreference. Because the PEG solvent had low volatility, the electrochemical cell could be placed directly into the MS ion source without significant amounts of PEG vapor entering the vacuum of the MS. However the time response was relatively long, reported to be 10 seconds or greater.

In each of the above references, an electron ionization (EI) source was used in mass spectrometry. Therefore only gaseous or volatile products of electrochemical reactions could be detected. Such a source does not allow the detection of nonvolatile intermediates and products of electrochemical reactions that remain in solution.

G. Hambitzer et al., "Electrochemical Thermospray Mass Spectroinetry," Anal. Chem., vol. 58, pp 1067–1070 (1986) connected an electrochemical cell to a thermospray (TS) mass spectrometer, and used this device to detect electrochemically-generated products such as dimers and trimers of the electrooxidation of N,N-dimethylaniline. A thermospray interface uses rapid heating to vaporize a solution. A portion of the resulting vapor enters the mass spectrometer, while the remainder is pumped away. A time delay (i.e., "dead time" or "response time") of about 9 seconds between the formation of a species and its mass signal response was reported, although the authors' opinion was that the response time could be reduced.

An electrochemistry/thermospray device reported in K. Volk et al., "On-line Electrochemistry/Thermospray/Tandem Mass Spectrometry as a New Approach to the Study of Redox Reactions: The Oxidation of Uric Acid," Anal. Chem., vol. 61, pp. 1709–1717 (1989) discloses the use of EC/TS/MS to study the oxidation of uric acid. A response time of 500 msec was reported. Because an aqueous ammonium acetate buffer solution was used in the thermospray process, all detected species were either protonated or were in the form of ammonium adduct ions when the device was run in the positive ion mode; or were deprotonated or acetate adducts in the negative ion mode. Radical cations and radical anions were not detected. See also K. Volk et al., "Electrochemistry On Line with Mass Spectrometry," Anal. Chem., vol. 64, pp. 21A–33A, reporting similar experiments on both uric acid and 6-thiopurine, and also giving a general review of the field.

So-called "electrospray" (ES) mass spectrometry is a soft-ionization technique. In electrospray ionization, an electric potential is applied to a liquid containing the analyte (s), usually via a conductive capillary needle. Typically, an analyte in solution is sprayed from a conducting needle (typically, with a 75–100 $\mu$m inner diameter) at a high voltage (typically, around 3000 V) towards a conducting aperture plate (typically at a potential between ground and about 300 V) leading to the input of the mass spectrometer. (Alternatively, a high voltage of the same magnitude but opposite polarity may be applied to the entrance aperture of the mass spectrometer.) Through a mechanism still in debate, ions are produced in the high electric field, and are then analyzed in a mass spectrometer.

ES can convert analytes in solution, at ambient temperature and pressure, directly into gas-phase ions without excessive fragmentation. ES/MS is suitable for the analysis of nonvolatile compounds that are either polar or ionic. An advantage of ES/MS over other soft-ionization techniques such as fast atom bombardment or thermospray is the formation of multiply charged species, making ES/MS well suited for the analysis of high molecular weight (up to 1,000,000 Da) biomolecules and polymers. See J. B. Fenn et al., "Electrospray Ionization—Principle and Practice," Mass Spectrom. Rev., vol. 9, pp. 37–70 (1990).

For general background on the mechanisms of electrospray, see P. Kebarle et al., "From Ions in Solution to Ions in the Gas Phase," Anal. Chem. vol. 65, pp. 972A–986A (1993). Analyte ions in ES mass spectrometry are usually considered either to be "preformed," i.e., already existing in ionic form in solution, or to be attached to or solvating such a "preformed" ion.

The compounds most amenable to prior ES/MS techniques are ionic compounds, and compounds that can readily be ionized in solution by acid/base reactions. In general, neutral and nonpolar compounds are not well-suited for ES/MS analysis. However, G. J. Van Berkel et al., "Electrochemical Origin of Radical Cations Observed in Electrospray Ionization Mass Spectra," Anal. Chem., vol. 64, pp. 1586–93 (1992) reported that radical cations of a few nonpolar analytes, such as metalloporphyrins and some polycyclic aromatic hydrocarbons, were detectable by ES/MS.

X. Xu et al., "Electrochemical Oxidation and Nucleophilic Addition Reactions of Metallocenes in Electrospray Mass Spectrometry," Anal. Chem., vol. 66, pp. 119–125 (1994) reported ES/MS studies on several substituted ferrocenes and other metallocenes. Intact molecular cations of these compounds were generated by electrochemical oxidation at the ES needle.

An electrospray device may be viewed as a special type of electrochemical cell. See A. Blades et al., "Mechanism of Electrospray Mass Spectrometry: Electrospray as an Electrolysis Cell," Anal. Chem., vol. 63, pp. 2109–2114 (1991). But the ability of prior electrospray devices to generate molecular cations from neutral compounds has been limited. Abundant molecular ion signals could only be obtained from compounds having lower $E_{1/2}$oxpotentials (roughly, those below +1.0 V versus SCE), and compounds whose oxidized forms are stable in solution.

G. J. Van Berkel et al., "Characterization of an Electrospray Ionization Source as a Controlled-Current Electrolytic Cell," Anal. Chem., vol. 67, pp. 2916–2923 (1995) disclosed that some electrochemical reactions may occur in a conventional electrospray ionization source, depending on the electrospray current, and on the redox potentials and concentrations of the species in the solvent system. The electrochemical reactions were analogized to those in a controlled-current electrolytic cell, and were reported to occur both at the metal/solution interface of the electrode needle, and at the aperture plate of the mass spectrometer. The means disclosed by Van Berkel et al. for controlling the electrochemical reactions in ES/MS were altering the flow rate, altering the ES current or voltage, and altering the composition of the electroactive species.

F. Zhou et al., "Electrochemically-Enhanced Electrospray Ionization-Mass Spectroscopy," Proceedings of 42nd ASMS Conference on Mass Spectroscopy (May 31–June 5, 1994) discuss the redox reactions that are inherent in an electrospray process, and the use of electrochemical cells to form cations from neutral analytes by electron transfer. Zhou et al. describe an ES source as a two-electrode, constant current electrolysis cell. To use the inherent oxidation effect of ES to ionize analytes, Zhou et al. suggest increasing the current, eliminating readily oxidizable species other than the analyte from the system, and using a material for the electrode needle that does not readily oxidize, such as gold. Zhou et al. also mention incorporating an electrochemical cell on-line with ES. Three cell designs were depicted by Zhou et al. All three designs are of two-electrode cells, and in all three there is significant "dead volume" between the area in which redox reactions occur, and the release from the electrospray needle, resulting in significant response time, and limiting the ability to detect short-lived intermediates and reaction products. Furthermore, with a two-electrode system it is difficult to control precisely the potential applied to the working electrode, because of variations in the impedance of different solutions. See also F. Zhou et al., "Electrochemistry Combined On-Line with Electrospray Mass Spectrometry," Anal. Chem., vol. 67, pp. 3643–3649 (1995), depicting similar devices with both two-and three-electrode systems, in which a ~6.5–7.0 cm tube transported electrochemical reaction products to the electrospray region by syringe pumping at flow rates up to the relatively high 120 $\mu$L/min; the travel time from the electrochemical cell to the tip of the electrospray capillary at this highest flow rate was reported to be ~1.0 second.

With a few exceptions, prior methods of mass spectrometry, whether ES/MS or otherwise, have not been suitable for analyzing large, nonpolar compounds. Because many analytes of interest are both nonvolatile and nonpolar, there is a continuing, unfilled need for improved mass spectroscopy devices and methods capable of successfully analyzing large, nonpolar compounds. The rapid identification of short-lived polar or ionic intermediates and products of electrochemical reactions remains a great challenge.

A novel method and apparatus have been discovered in which an electrochemical cell is coupled on-line with an electrospray or other soft ionization mass spectrometer with minimal response time. The electrospray embodiment of the novel system may be called rapid electrochemical-electrospray mass spectrometry (EC/ES/MS). The novel system achieves at least two goals not previously realized: (1) many large, nonpolar compounds that could not be analyzed by prior ES/MS techniques may now be analyzed;

and (2) ionic and polar intermediates and products generated by electrochemical reactions may be probed with very short response times prior to their analysis.

In most prior ES/MS methods, ions have been produced by solution-phase reactions, e.g., protonation and deprotonation. In the present method, by contrast, ions are generated by electrochemical oxidation or reduction.

The following difficulties have been overcome: (1) the long response time caused by the low flow rate of prior electrospray devices; (2) the high voltage hazard presented to the electrochemical devices and to the operator of the device by the electrospray elements themselves; and (3) suppression of the strong MS signal from the high concentration of supporting electrolyte.

This on-line coupling of the electrochemical cell to mass spectrometry permits the fast identification of ionic intermediates (both radicals and non-radicals), as well as products generated from electrochemical reactions and from ensuing solution-phase reactions. Rapid EC/MS is a novel tool for studying the mechanisms of complicated electrochemical reactions such as those occurring in biological redox systems or in organic electrochemical syntheses. Rapid EC/MS also allows the analysis of neutral compounds that are otherwise difficult to analyze by ordinary electrospray mass spectrometry.

An important feature of the novel EC/MS system is that it generates electrochemical intermediates (e.g., radical cations) and products in situ at the tip of the electrospray needle. Thus the intermediates are produced immediately prior to injection into the mass spectrometer itself, minimizing response time.

A cell in accordance with the present invention may either be constructed as an integral part of a mass spectrometer, or it may be placed as an accessory on a mass spectrometer. "Retrofitting" existing mass spectrometers with such a cell is straightforward, and will not present any unusual difficulties.

BRIEF DESCRIPTION OF THE DRAWINGS

FIGS. 10(*a*) and 10(*b*) illustrate alternative mechanisms for the nucleophilic addition of pyridine to the electrogenerated 9,10-diphenylanthracene (DPA) cation radical.

Figure 2:
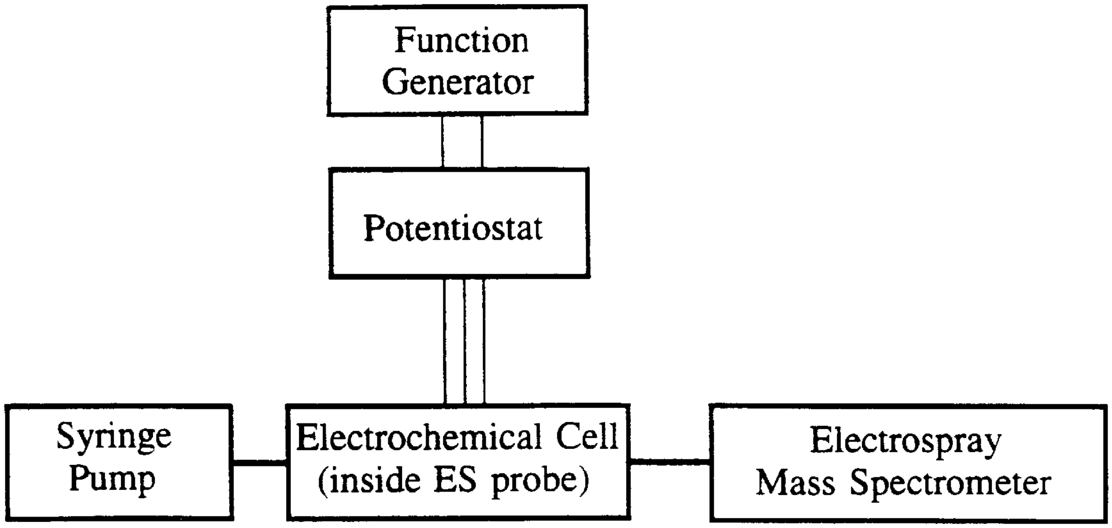
FIG. 2 illustrates a schematic depiction of an embodiment of an on-line electrochemistry/electrospray mass spectrometer in accordance with the present invention.

A schematic depiction of an embodiment of an on-line electrochemistry/electrospray mass spectrometer in accordance with the present invention is illustrated in FIG. 2.

Figure 1A:
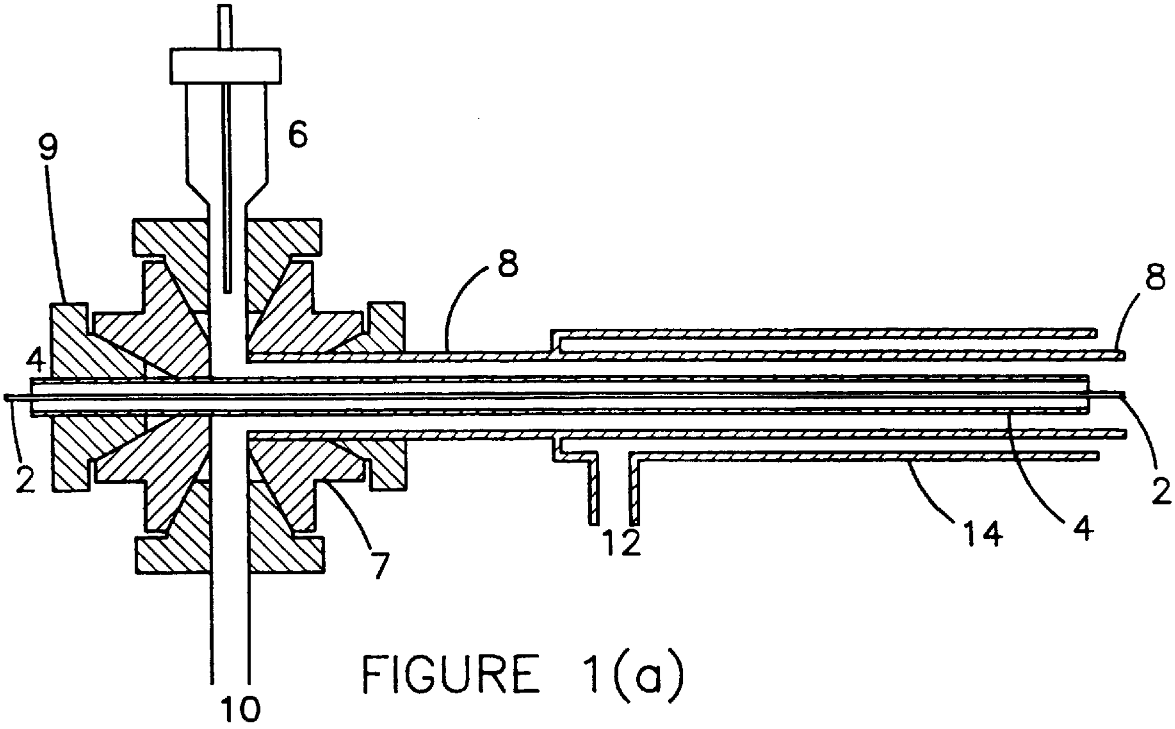
FIGS. 1(*a*) and 1(*b*) illustrate alternative embodiments of a three-electrode electrochemical probe in accordance with the present invention.
Figure 1B:
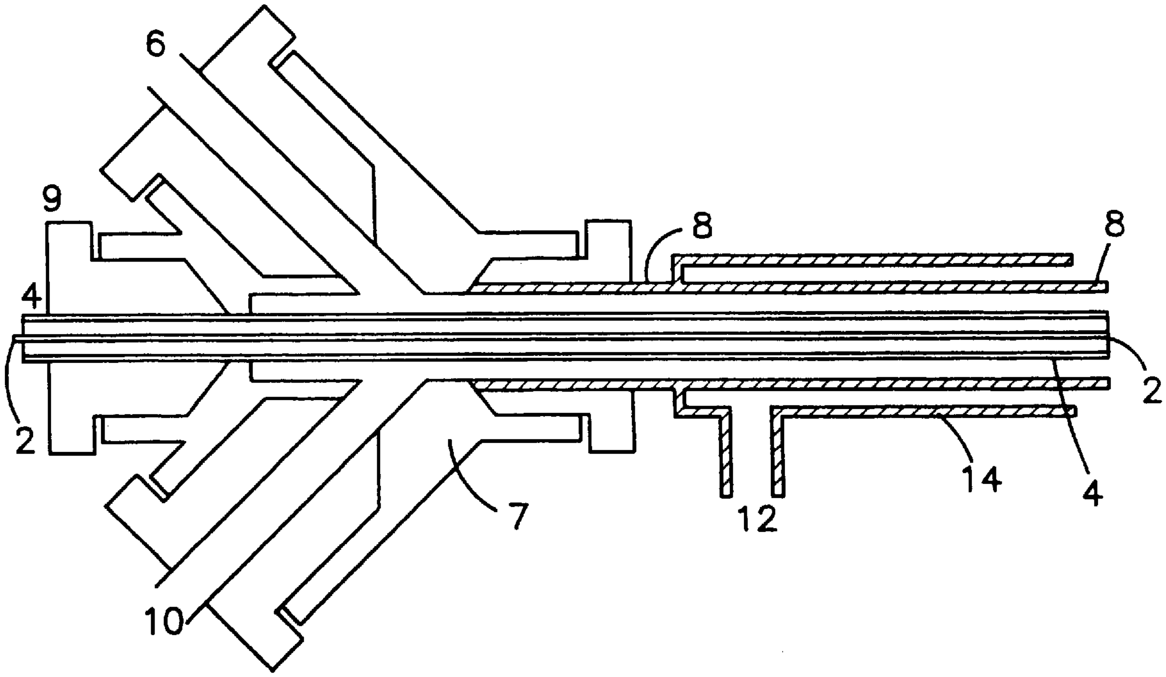

As illustrated in the alternative embodiments depicted in FIGS. 1(*a*) and 1(*b*) (in which the same reference numerals refer to the same type of component), a preferred embodiment of this invention employs a three-electrode flow cell constructed as part of an electrospray probe. Platinum microcylinder electrode 2, sealed inside fused silica layer 4, was the working electrode. The fused silica layer 4 prevented electrical contact between working electrode 2 and the sample solution. The fused silica also acted as a spacer, to keep working electrode 2 and auxiliary electrode 8 from contacting one another. Working electrode 2 may also be made from other electrode materials known in the art, such as a carbon fiber, mercury film, gold wire, tungsten wire, nickel wire, iridium wire, platinum-iridium alloy wire, or a cobalt-chromium-nickel alloy. Reference electrode 6, a $Ag/Ag^+$ (0.01M in acetonitrile, $CH_3CN$) electrode, was isolated from the sample solution by a glass tip (not shown). Stainless steel tubing 8 served as both the auxiliary electrode and the electrospray capillary. Sample was injected at port 10, and nitrogen carrier gas to pneumatically assist the electrospray was injected at port 12 of stainless steel tube 14.

Reference electrode 6 provides a convenient reference point for accurately controlling the potential of working electrode 2 so that the resulting current-potential (or MS signal-potential) response is characteristic of the processes occurring at working electrode 2. Because the current passing through the reference electrode is quite small, the contribution of "iR drop" to the measured potential difference between the working electrode and the reference electrode is negligible. By contrast, in a two-electrode arrangement, the contribution of "iR drop" to the measured potential difference between electrodes is significant, which can leave uncertainty as to the actual potential of the working electrode. Having a standard reference electrode as a benchmark overcomes these measurement difficulties. The reference electrode may be any electrode whose potential has been established, and whose potential remains constant during the course of an experiment of interest—for example a standard calomel electrode ("SCE") or other standard electrodes known in the art. The current required to sustain electrolysis at the working electrode is supplied by the auxiliary electrode, to prevent the reference electrode from being subjected to excessive current that could alter its potential.

As illustrated in FIG. 1(*a*), reference electrode 6 was positioned perpendicular to the direction of sample flow. In the embodiment illustrated in FIG. 1(*b*), reference electrode 6 is placed more nearly parallel to the direction of sample flow by placing reference electrode 6 and sample port 10 in a "Y" configuration leading to auxiliary electrode 8; reference electrode 6 could also be placed "upstream" from sample port 10; all to try to minimize any backflow of sample into the reference electrode 6. If probe space permitted, reference electrode 6 might be placed closer to working electrode 2 to minimize back pressure and dead volume in the cell.

A battery-powered potentiostat (not illustrated) controlled the potential applied to the electrodes of the cell, and was also used to measure the current through the cell.

As illustrated in FIGS. 1(*a*) and 1(*b*), four Finger-tight™ fittings 9, each with a Teflon™ ferrule and a Teflon™ sleeve were used to seal auxiliary electrode 8, fused silica layer 4, reference electrode 6 and sample port 10 onto a PEEK (polyetherketone resin) cross 7. Nitrogen gas entering port 12 and exiting near the exposed portion of working electrode 2 pneumatically assisted the electrospray process.

A circuit (not illustrated) protected the potentiostat from damage from the high voltage surges (2–4 kV) generated during the electrospray process.

An important feature of the novel device is that it can generate electrochemical intermediates (e.g., radical cations) and products in situ at the tip of the electrospray capillary, between working electrode 2 and auxiliary electrode 8. As a result, response time is minimized, and fast response times (<~3 second) have been achieved even at very low flow rates (2.1 μL/min) through the cell.

The volume of the prototype cell depicted in FIG. 1(*a*) was very small (about 0.125 μL), while the surface area of the working electrode was relatively large (about 0.60 $mm^2$), helping to minimize band broadening while maintaining high electrochemical conversion efficiency. Thus this device could also be used as a novel electrochemical detector for processes such as HPLC or capillary electrophoresis.

The alternative embodiment illustrated in FIG. 1(*b*) has a working electrode 2 comprising a microdisc (roughly 0.12 to 0.25 mm diameter) of platinum (or other electrode material) sealed in fused silica layer 4, with only the end surface of the microdisc exposed to the solution. Compared to the embodiment of FIG. 1(*a*), this alternative embodiment has the advantages that the risk of deforming the working electrode is lessened, and that the surface of the working electrode may be gently polished to expose a fresh electrode surface, without dismantling the cell. This design could result in a faster response time, as the average distance from the surface of the working electrode to the outside of the "Taylor cone" of the electrospray is reduced. For the same reason, backflow of intermediates and products would be reduced.

A disadvantage of the alternative embodiment of FIG. 1(*b*) is that the exposed surface area of the working electrode is smaller, leading to a lower electrolysis efficiency. To minimize this possible problem, the diameter of the working electrode should be made as large as possible, consistent with the dimensions of the other components of the probe.

This "microdisc" embodiment may be most suitable for the following applications: where a fast response time is more important than sensitivity; where the problem of electrode "fouling" is severe, so that the electrode requires frequent polishing; and where the amount of analyte is minute (less than ~$10^{-9}$ mole), so that very low flow rates are required.

As examples of the applications of EC/ES/MS, we describe below a reinvestigation of the electrochemical oxidation of a series of polycyclic aromatic hydrocarbons (PAH's) using the probe depicted in FIG. 1(*a*). Compared to prior work on the oxidation of PAH's, a different abundance of PAH radical cations was observed by EC/ES/MS. This difference is believed to be due to the stabilities and structural features of the radical cations involved. Also described below are additional technical details regarding the construction and operation of the prototype depicted in FIG. 1(*a*).

The EC/ES device can function in the presence or absence of a nebulizing gas delivered through port 12 to tube 14. The advantage of a nebulizing gas is that it permits electrospray operation at higher liquid flow rates. Nitrogen is a commonly used nebulizing gas; sometimes gases with electron-scavenging properties are used, such as $SF_6$. The electrochemical device can also function in the absence of an electrospray release of droplets by using so-called "aerospray" conditions. The term "aerospray" refers to the pneumatic production of a mist or spray of droplets via a nebulizer, including droplets bearing a net charge to produce ions for mass spectrometry. See generally J. Fenn et al., "Electrospray Ionization—Principles and Practice," Mass Spec. Rev., vol. 9, pp. 44*ff* (1990).

The use of pneumatic sprayers to generate ions from evaporating droplets is old in the art, although coupling to mass spectrometers, often in combination with electrospray ionization, is more recent. See generally J. Iribarne et al., "On the Evaporation of Small Ions from Charged Droplets," J. Chem. Phys., vol. 64, pp. 2287–2294 (1976); B. Thomson et al., "Field Induced Ion Evaporation from Liquid Surfaces at Atmospheric Pressure," J. Chem. Phys., vol. 71, pp. 4451–4463 (1979); and A. Bruins et al., "Ion Spray Interface for Combined Liquid Chromatography/Atmospheric Pressure Ionization Mass Spectrometry," Anal. Chem., vol. 59, pp. 2642–2646 (1987).

B. Thomson et al. used a nitrogen "curtain gas," which may optionally be heated, before the sampling orifice leading to the mass spectrometer to reduce blockage of the orifice, and to aid in the evaporation of sprayed droplets. This device could thus be used to produce ions for analysis by mass spectrometry, even in the absence of an electrospray release.

In another alternative, the electrochemical device could also give satisfactory results by using heat to aid in the production and evaporation of droplets bearing electrochemically-generated species. Ion production from rapidly heated solutions can occur without the strong electric field needed to produce electrospray release. The use of rapid heating to produce ions for mass spectrometric analysis has been termed "thermospray" ionization. See generally C. Blakely et al., "Liquid Chromatograph-Mass Spectrometer for Analysis of Non-volatile samples," Anal. Chem., vol. 52, pp. 1636–1641 (1980); and C. Blakely et al., "A New Soft Ionization Technique for Mass Spectrometry of Complex Molecules," J. Am. Chem. Soc., vol. 102, pp. 5931*ff* (1980). To use rapid heating with the novel electrochemical device, the tip of the output end of the electrochemical device should be subjected to rapid heating immediately prior to entry into a suitably pumped orifice leading to a mass spectrometer. Under rapid heating conditions, where the capillary tip is heated well above the boiling point of the solution (e.g., 250° C. or above), it would not be necessary to float the electrochemical cell at the high voltage needed to achieve electrospray release. Droplet evaporation at the thermospray heater could also be aided by pneumatic nebulization.

Construction and Operation of the Electrochemical Cell

An electrochemical flow cell inside an electrospray probe was constructed, as depicted in FIG. 1(*a*). The cell comprised three electrodes: platinum working electrode 2 (0.127 mm diameter, 1.5 mm of length exposed) in fused silica capillary 4 (0.170 mm I.D., 0.300 mm O.D.); stainless steel auxiliary electrode 8 (0.35 mm I.D., 0.405 mm O.D.); and Ag/$Ag^+$ (0.01M in $CH_3CN$) reference electrode 6 (Bioanalytical System, Lafayette, Ind.), isolated from the sample solution by a Vyor™ (Corning Co.) glass tip that allowed migration of ions but prevented flow of solution. A polyimide coating on fused silica capillary 4 was resistant to all solvents used in the examples reported below.

The sample solution was delivered to port 10 by a syringe pump (not shown) (model 341B, Sage Instrument, Boston, Mass.). Sample then passed through the thin layer channel between the outer layer of fused silica layer 4 and the inner surface of auxiliary electrode 8, until it reached the vicinity of the exposed portion of working electrode 2. This thin layer channel also served as a salt bridge to reference electrode 6. There was essentially no iR drop in the solution along the channel, because essentially no current flowed along the channel (i.e., from the reference electrode). A low electrolyte concentration helps increase the sensitivity of the mass spectrometer.

Immediately following electrochemical reaction in the zone between the exposed portion of working electrode 2 and auxiliary electrode 8, sample solution was electrosprayed directly into the mass spectrometer (not shown) for analysis.

The following procedure was found to be effective for regenerating the active electrode surface of working electrode 2 after electrooxidation of PAH's: (1) dipping the cell tip into acetonitrile during a 100 Watt ultrasound sonication for about two minutes while pumping a total of 200 μl acetonitrile through the cell to clean up salts and polar compounds; (2) replacing the solvent with 200 μl toluene, and repeating step (1) with the toluene to remove electrodeposited PAH's; (3) rinsing the cell with 200 μl $CH_2Cl_2$; and (4) switching the applied potential back and forth between +0.5 V and −0.5 V (holding the voltage at each value for 10 seconds), while pumping 100 μl electrolyte solution (blank) through the cell for 2 minutes at a flow rate of 50 μL/min. This electrode pretreatment procedure enabled reproducible EC/ES/MS results.

Voltammetry

In the on-line EC/ES/MS experiments, a potentiostat (LC-4A Amperometric Controller, Bioanalytical Systems, Lafayette, Ind.) was used to control the potential applied to the cell, and to measure the resulting current. A function generator (CV-2B Cyclic Voltammetry, Bioanalytical Systems, Lafayette, Ind.) was used to generate the excitation signal for on-line voltammetry, e.g., linear sweep voltammetry. To reduce the potential hazard created by electrospray at high voltage (HV), the power sources of the electrochemical instruments were replaced with rechargeable batteries. The entire electrochemical system was shielded and floated at the electrospray HV by connecting the frame of the electrochemical instruments and the shield to the HV supply. During operation, the electrochemical experimental parameters were selected before turning on the HV. Typical voltages used were in the 2–3.5 kV range, optimized for best sensitivity The potentiostat was switched from "standby" to "on" with a seven-inch-long polyethylene "knob" to minimize the risk of electric shock. In off-line linear sweep and cyclic voltammetry experiments, a CV-27 Voltammograph electrochemical system (Bioanalytical Systems) was used to measure basic electrochemical parameters, such as the accessible potential range of the solvent and supporting electrolyte.

Mass Spectrometry.

A quadrupole electrospray mass spectrometer (Vestec 201, PerSeptive Biosystems, Houston, Tex.) was used in all experiments reported here. The mass spectral data reported below are average results of at least twenty scans each over the m/z range ~100 to ~600, with scan rates typically between 0.1–0.5 second/scan.

Reagents

All solvents used in the examples reported here were HPLC grade, and were purchased either from J. T. Baker (Philipsburg, N.J.) or from E. M. Science (Gibbstown, N.J.). Acetonitrile was preliminarily dried with calcium hydride (STREM Chemicals, Newburyport, Mass.) for 24 hours, followed by distillation over phosphorus pentoxide, and storage over $CaH_2$ in a desiccator. Methylene chloride was dried by passage through an activated alumina column (preheated for 7 hours at 175° C.), followed by storage over alumina. Supporting electrolytes, lithium trifluoromethylsulfonate, and tetrabutylammonium perchlorate (TBAP) (all purchased from Fluka Chemical Corp., Ronkonkoma, N.Y.) were dried in small quantities (ca. 100 mg) at 110° C. for 3 hours before use. The diphenyl sulfide and all PAH's were purchased either from Sigma (St. Louis, Mo.) or from Aldrich (Milwaukee, Wis.), and were used without further purification.

Optimization of the EC/ESIMS System.

Several factors influenced the performance of the prototype EC/ES/MS system. These factors included the configuration of the electrochemical cell, the solvent(s) used, the supporting electrolyte(s) used, the flow rate, and the temperature. The effects of these factors were investigated to try to optimize the response time and the detection sensitivity.

Solvents

In selecting solvents for use in on-line EC/ES/MS, the requirements of both the electrochemical cell and the electrospray mass spectrometer should be taken into account. The dielectric constant, accessible potential range, surface tension, boiling point, viscosity, and reactivity to radical ions should all be consistent with both the EC system and the ES/MS system being used. The properties of a number of solvents commonly used in electrochemistry are listed in Table 1.

TABLE 1

Properties of Some Solvents

| Solvent | Boiling Point (°C.) | Dielectric Constant | Viscosity at 15° C. (cp) | Potential Limits (volts) | Nucleophilicity |
|---|---|---|---|---|---|
| Acetonitrile | 81.6 | 37.5 (25° C.) | 0.375 | −3.5 to +2.4 | moderate |
| N,N-dimethyl formamide | 153 | 36.7 (25° C.) | 0.92 (20° C.) | −3.5 to +1.5 | moderate |
| Propylene carbonate | 241.7 | 69 (25° C.) | — | −2.5 to +1.7 | moderate |
| Methylene Chloride | 39.8 | 9.08 (20° C.) | 0.449 | −1.7 to +1.8 | low |
| Nitromethane | 101 | 36.7 (20° C.) | 0.620 (25° C.) | −1.2 to +2.7 | — |
| Nitrobenzene | 210.9 | 34.82 (25° C.) | 2.24 | — | low |
| Methanol | 64.7 | 32.63 (25° C.) | 0.623 | −2.2 to +1.5 | high |
| Water | 100 | 80.10 (20° C.) | 1.139 | −2.7 to +1.5 | high |

Acetonitrile is probably the most widely used nonaqueous solvent for organic electrochemistry because of its high dielectric constant (high polarity), wide accessible potential range (−3.5 to +2.4 V versus SCE), and the convenient range of temperatures over which it stays liquid (−45° through 81.6° C.). Acetonitrile is also a good solvent for ES/MS. Due to its moderate nucleophilicity, however, it is not preferred for EC/ES/MS detection of radical cations of PAH's. For the same reason, neither methanol nor water should be used as a solvent in electrooxidation of PAH's, unless it is desirable to add a nucleophile or methoxylating reagent for a particular electrochemical reaction. It has been reported that radical cations of PAH's are considerably more stable in nitrobenzene than in acetonitrile, but the boiling point of nitrobenzene is too high to be used as a solvent for electrospray. For similar reasons, propylene carbonate is not preferred as a solvent for electrospray.

Dimethylformamide is less nucleophilic than acetonitrile; but its high boiling point, high viscosity, and narrow anodic potential limit make it a less-than-preferred solvent for the EC/ES/MS study of electrochemical oxidation. Methylene chloride has good electrospray properties (namely, a low boiling point and low viscosity), and its anodic limit is wide enough for the oxidation of most PAH's. In particular, methylene chloride can stabilize the radical cations of PAH's, an important consideration in EC/ES/MS studies. $CH_2Cl_2$ has drawbacks, namely its low dielectric constant and its relatively low solvating power. Also, few salts are soluble in $CH_2Cl_2$.

No one solvent is perfect for all EC/ES/MS applications. Despite its drawbacks, methylene chloride was chosen as the preferred solvent for the EC/ES/MS detection of radical cations of PAH's, primarily because of its low nucleophilicity.

Supporting Electrolytes

Figure 3A:
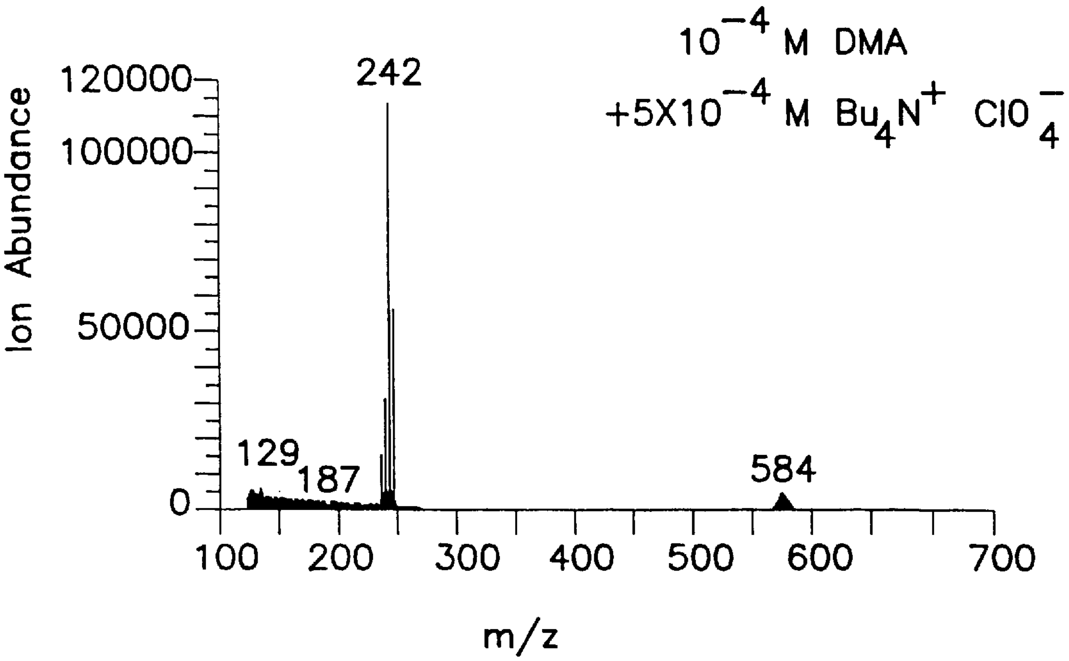
FIGS. 3(*a*) and 3(*b*) illustrate the effect of different electrolytes on signal strength.
Figure 3B:
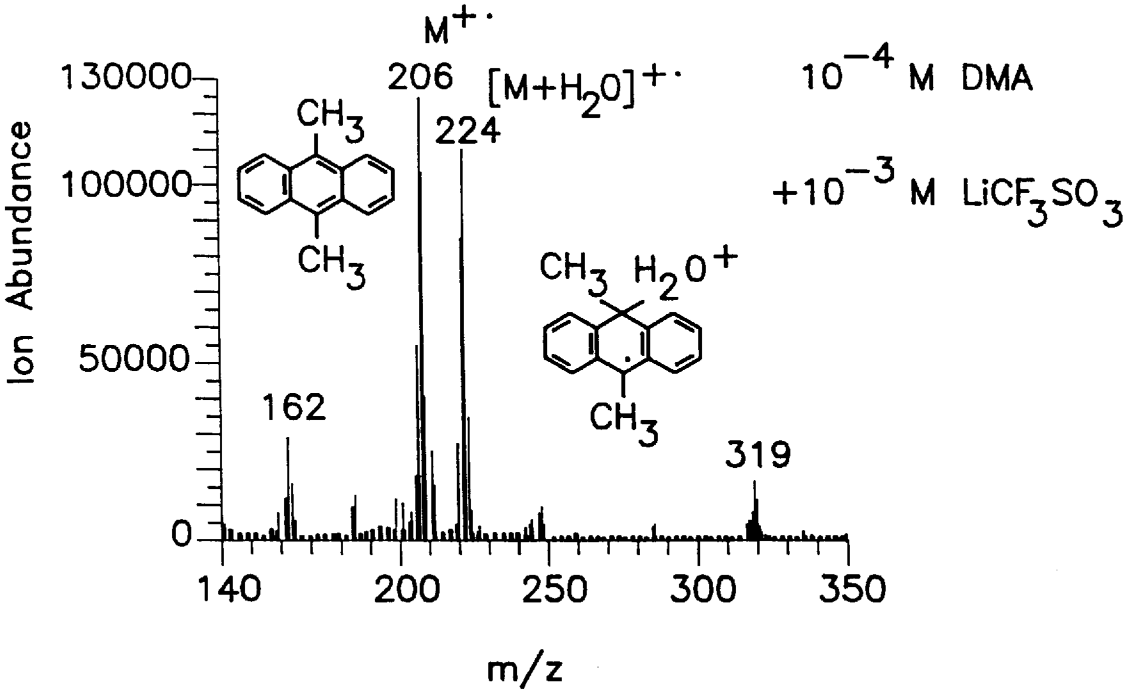

In prior ES/MS applications, an excess of supporting electrolyte (about 10 to 100 times the concentration of analyte by weight) has usually been added to the solution to obtain sufficient conductivity, and to maintain electroneutrality during electrolysis. But higher electrolyte concentrations decrease the sensitivity of ES/MS. In methylene chloride, tetrabutylammonium perchlorate (TBAP) or tetrabutylammonium hexafluorophosphate are the supporting electrolytes used most often. The high surface activity of $TBAP^+$ decreases the analyte signal in an ES/MS spectrum significantly. For example, as is illustrated in FIG. 3(*a*), we observed that the addition of $5\times10^{-4}$M TBAP effectively suppressed the analyte signal for $10^{-4}$M 9,10-dimethylanthracene (DMA), even though a substantial faraday current (300 nA) passed through the cell. The highest peak in FIG. 3(*a*), with m/z=242, was attributed to the tetrabutylammonium ion. The peak at m/z=584 was attributed to the $[Bu_4NClO_4]Bu_4N^+$ cluster ion. (Other smaller peaks in FIG. 3(*a*) have not been assigned, and may result from impurities.)

Lithium trifluoromethylsulfonate, $LiCF_3SO_3$, does not excessively suppress the analyte signal, but that salt has limited solubility in $CH_2Cl_2$. $LiCF_3SO_3$ was therefore first dissolved in purified acetonitrile at a concentration up to 0.1M, and the resulting solution was then mixed with $CH_2Cl_2$. It was found that a preferred mixed solvent 5% $CH_3CN$/95% $CH_2Cl_2$ (v/v) can dissolve up to $10^{-3}$M $LiCF_3SO_3$; and that the mixed solvent 10% $CH_3CN$/90%$CH_2Cl_2$ can dissolve up to $10^{-2}$M. The concentration of acetonitrile was kept at minimum to reduce its influence on the stability of radical cations. A high abundance of DMA radical cation ($M^{+\bullet}$) was detected in 5% $CH_3CN$/95%$CH_2Cl_2$ containing $10^{-3}$M $LiCF_3SO_3$, as illustrated in FIG. 3(*b*), as was the $[M+H_2O]^{+\bullet}$ water adduct.

Figure 4A:
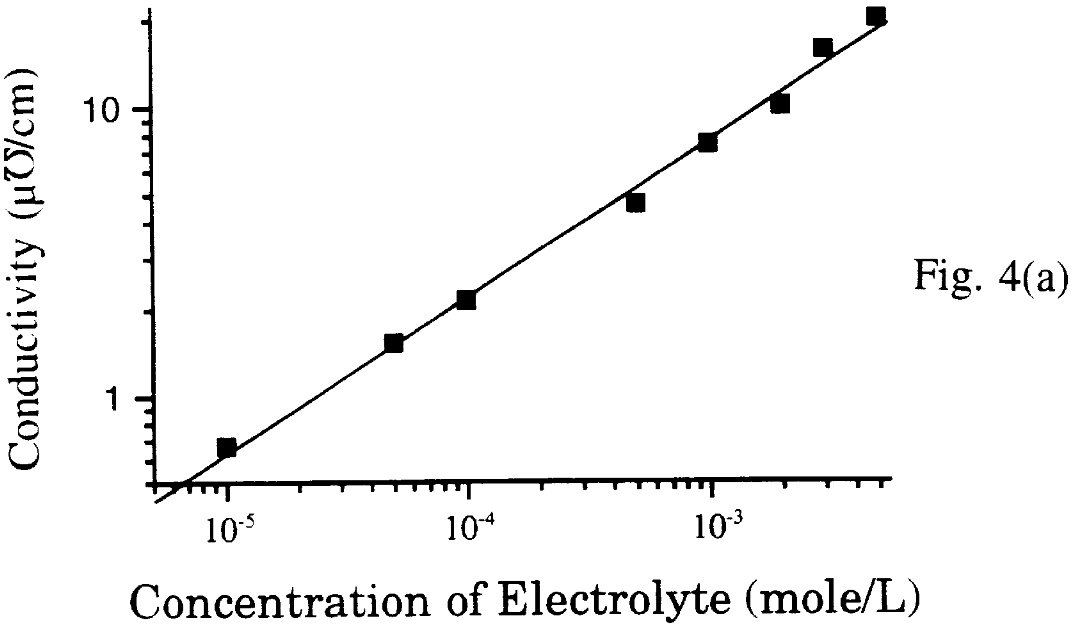
FIGS. 4(*a*) and 4(*b*) illustrate the conductivity of the solution and the signal strength as functions of electrolyte concentration.
Figure 4B:
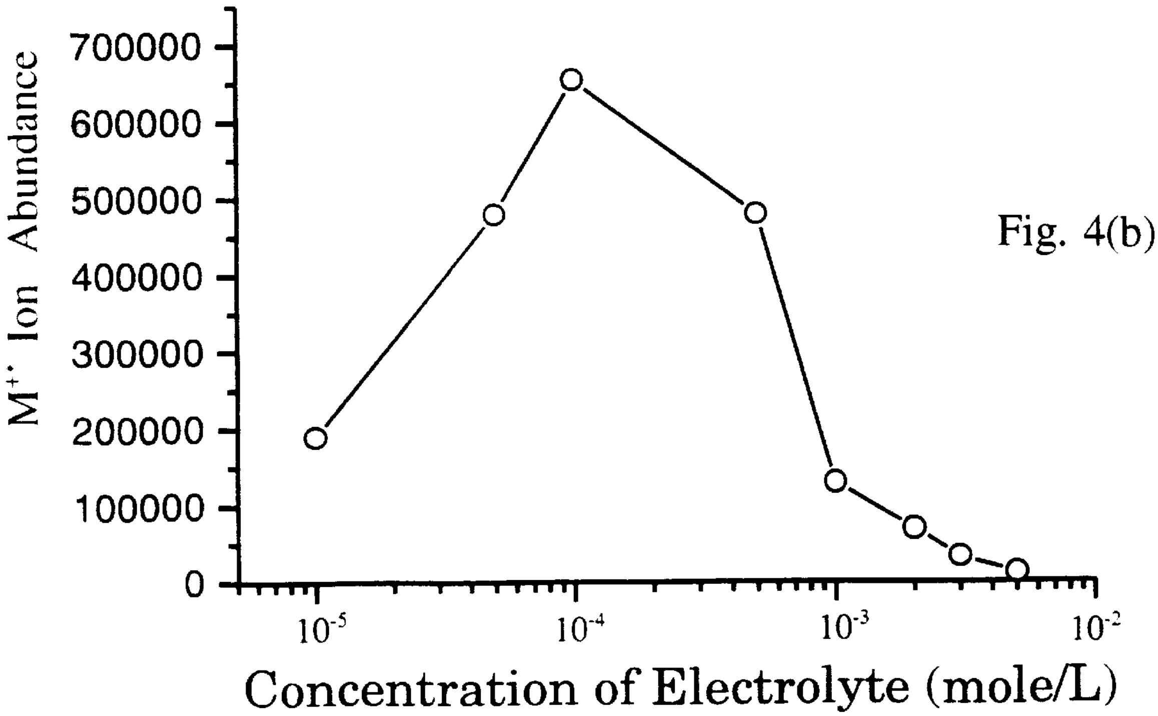

The conductivity of the solution, and the abundance of the DMA radical cation in solutions with different concentrations of $LiCF_3SO_3$ are illustrated in FIGS. 4(*a*) and 4(*b*). The preferred concentration of supporting electrolyte was thus about 1–$5\times10^{-4}$M with a concentration of $10^{-4}$M analyte. Below this level, the conductivity of the solution was too low, and consequently so was the electrochemical conversion efficiency.

At a very low concentration of supporting electrolyte (less than about $10^{-5}$M), a high abundance of $M^{+\bullet}$ sometimes appeared for a very short time (about 1–3 seconds) following the initial application of potential to the cell (a "potential-step"). However, this signal disappeared quickly, and stable EC/ES/MS conditions could not be maintained at such low concentrations. On the other hand, an increase of the supporting electrolyte concentration above about $5\times10^{-4}$M substantially suppressed the analyte signal.

Temperature.

In ES/MS experiments not using pneumatic assistance, a probe temperature in the range of 50°–70° C. has generally been preferred to facilitate evaporation of solvents and to increase sensitivity. However, in our EC/ES/MS experiments with 5% $CH_3CN$/95%$CH_2Cl_2$, we have found that the preferred probe temperature lies in the range 40°–43° C. (at a heating block temperature of 186°±2° C). Higher temperatures disrupt the electrospray process, because they approach or exceed the boiling point of the solution. (The boiling point of the solution was slightly higher than that of pure $CH_2Cl_2$ (39.7° C.) due to the addition of $CH_3CN$ and other solutes). More generally, the preferred probe temperature is the lower of: (a) a temperature just below the boiling point of the solvent, or (b) the otherwise preferred ES/MS range of 50°–70° C.

Position of the Working Electrode

The position of the working electrode also influenced the response time and the detection sensitivity. The fastest response time and the highest sensitivity were obtained when the working electrode was exposed approximately 0–0.3 mm from the end of the auxiliary electrode, i.e. with the working electrode partially entering the "Taylor cone," the small cone of liquid that forms at the tip of the capillary electrode under the influence of the electric field. Small charged droplets of liquid were emitted from a "filament jet" extending from the tip of the Taylor cone. Withdrawing the working electrode inside the auxiliary electrode increased the response time and lowered the detection sensitivity, while extending the working electrode further into the Taylor cone rendered the electrospray unstable, or even caused electric discharge. Withdrawing the working electrode about 1 to 2 mm from the base of the Taylor cone can reduce interference between the electrospray and the electrochemistry, i.e., produce a more stable current in the cell and the electrospray, at the cost of a longer response time. Further withdrawing of the working electrode from the Taylor cone produced no advantages, and only increased the response time.

Off-line Linear Sweep Experiment

To validate the performance of the electrochemical system, an off-line linear sweep experiment was conducted with $10^{-4}$M 9,10-diphenylanthracene (DPA) in 5% $CH_3CN$/95%$CH_2Cl_2$ containing $10^{-4}$M $LiCF_3SO_3$. The accessible anodic potential range was about +1.7 V versus $Ag/Ag^+$ (0.01M), i.e., about +2.0 V versus SCE. The $E_{1/2,ox}$ of DPA was measured as 0.89 V versus $Ag/Ag^+$ (0.01M), close to the reported value in the literature of 0.92 V. The limiting diffusion current was reached at +1.3 V to +1.5 V.

Response Time of the EC/ES/MS system

Figure 5A:
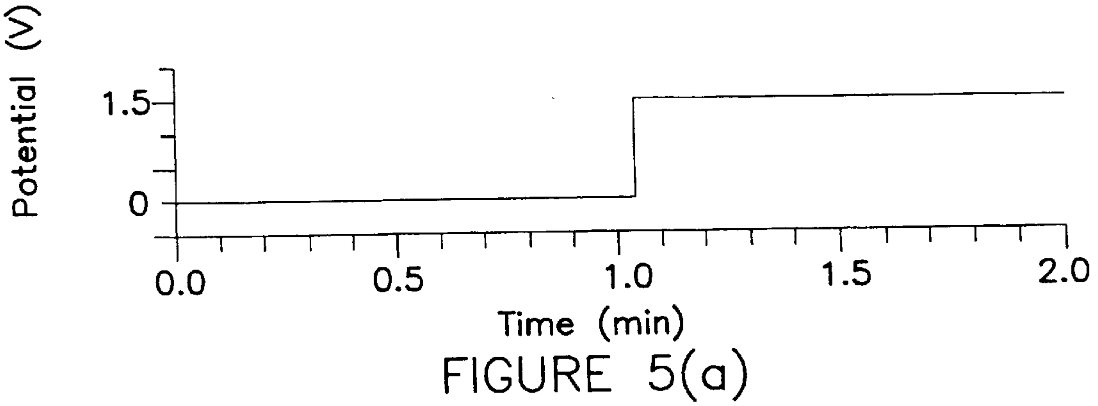
FIGS. 5(*a*), 5(*b*), and 5(*c*) illustrate applied potential, ion current response time, and mass spectrum in a potential-step experiment.
Figure 5B:
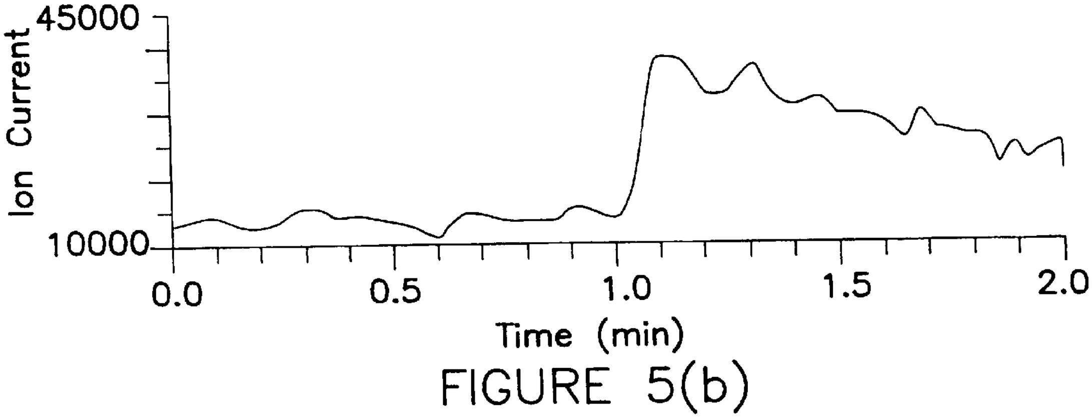
Figure 5C:
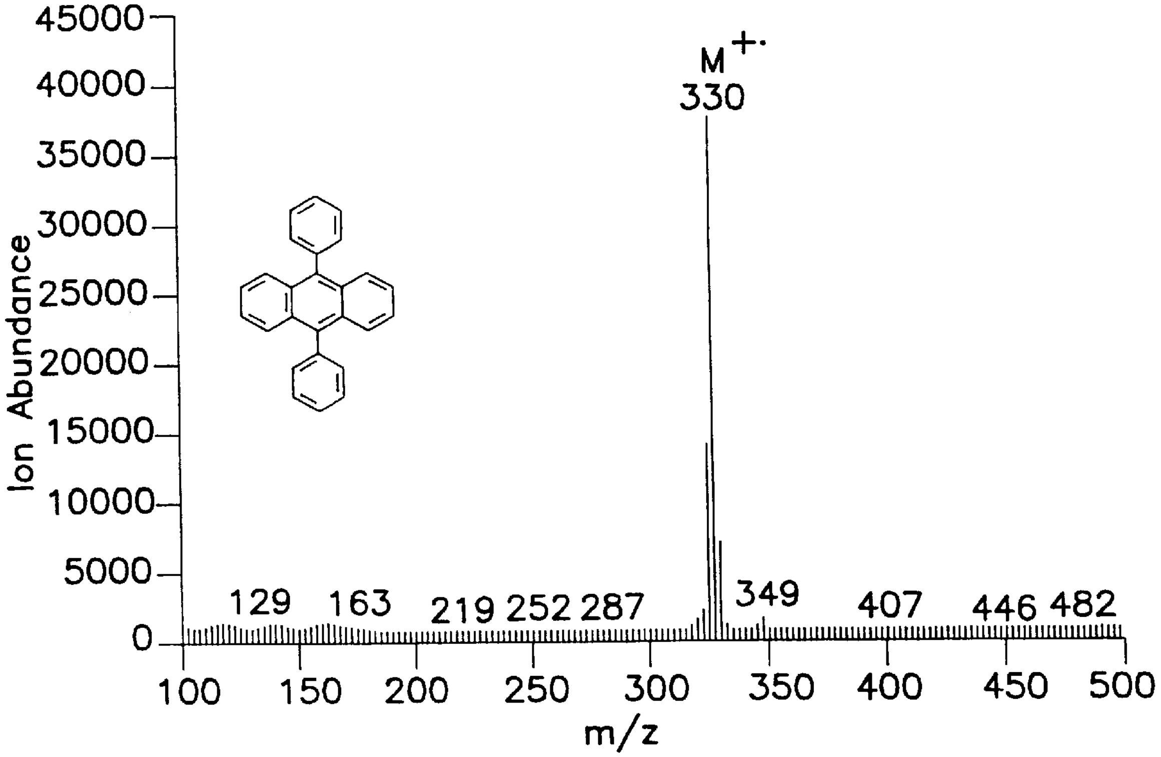

The response time, i.e. the time delay between the application of a potential to the cell and the detection of the selected signal, should be as short as possible in order to detect short-lived species. The response time of our prototype EC/ES/MS system was determined by a potential-step experiment with DPA under the preferred conditions described above. The results are illustrated in FIGS. 5(*a*), 5(*b*), and 5(*c*). After applying +1.5 V to the working electrode, the signals for the molecular radical cation of DPA (m/z=330) increased sharply. The response time was 2.3 seconds at a flow rate of 2.1 $\mu$l/min.

The response time is a function of (and is roughly the sum of) the time delays of several different processes, including electron transfer, diffusion of the electrochemically-generated species away from the electrode surface, transportation of these species to the surface of the Taylor cone, formation of charged droplets, transportation of ions through the mass spectrometer to the detector, and acquisition of data. The second and third steps, i.e., the diffusion and transportation of the electrochemically generated species, are believed to be the rate-determining steps. If this assumption is correct, then it follows that the flow rate of the sample solution will influence the overall response time.

Figure 6A:
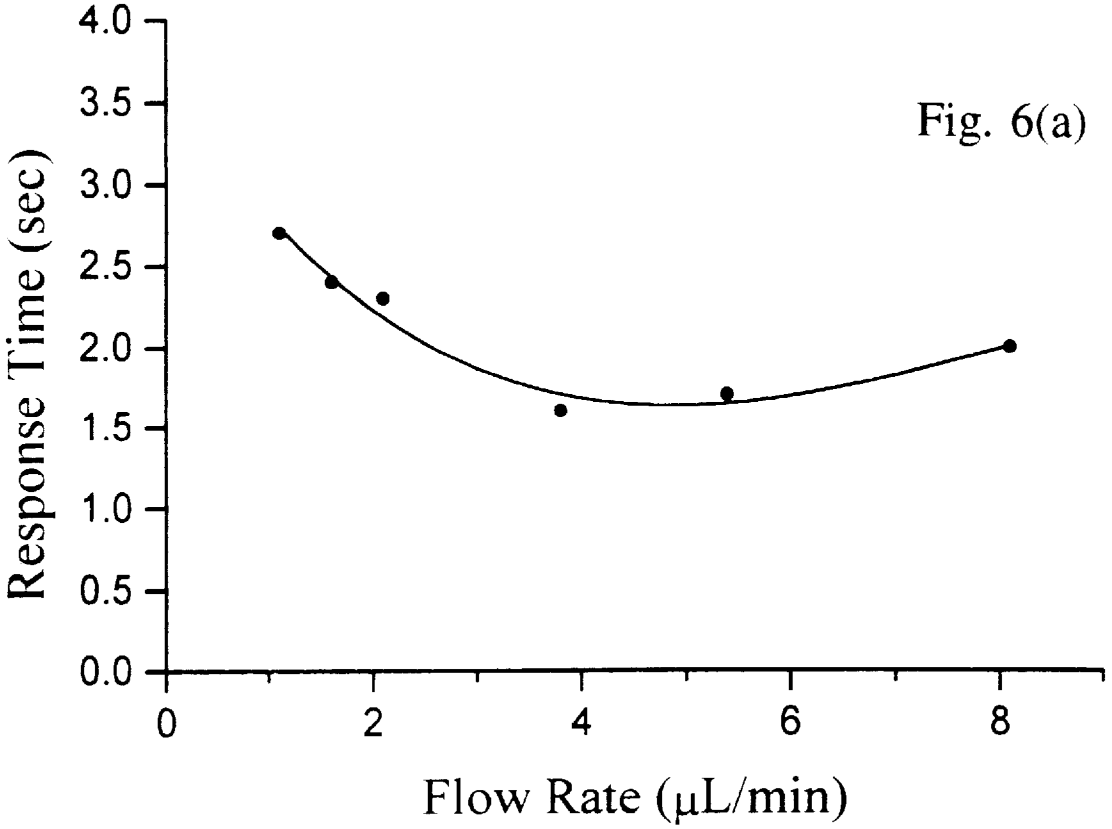
FIGS. 6(*a*) and 6(*b*) illustrate the effect of flow rate on response time and sensitivity.
Figure 6B:
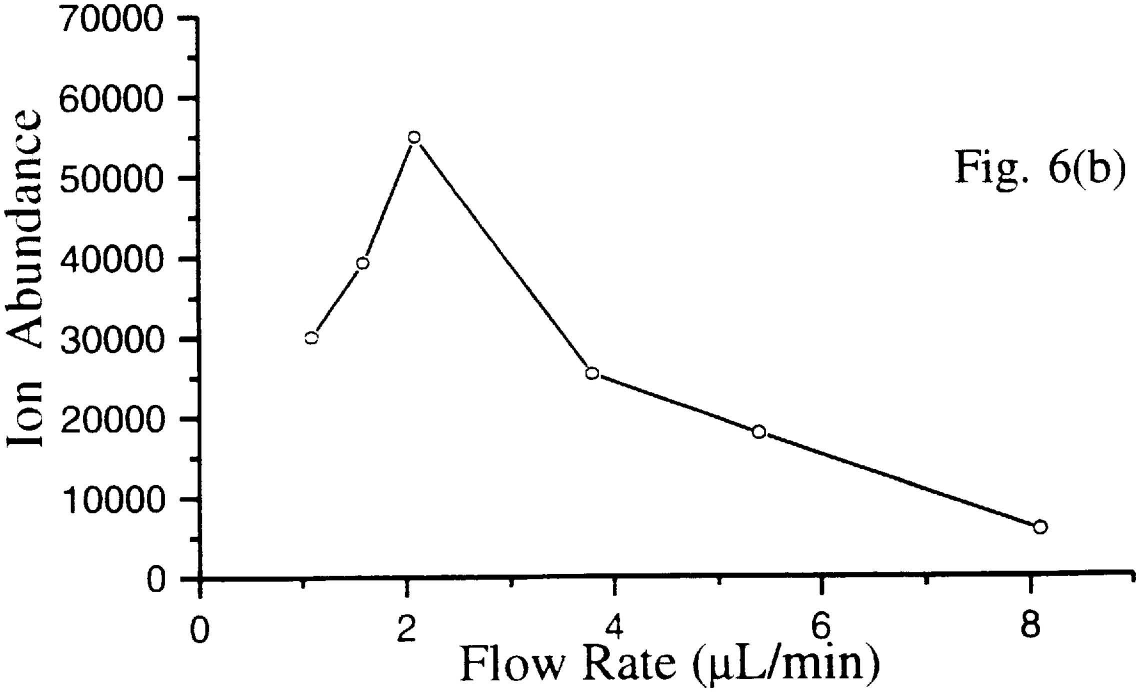

We have investigated the effect of flow rate on the response time and on the sensitivity of EC/ES/MS with DPA in the absence of pneumatic assistance. See FIGS. 6(*a*) and 6(*b*). We expected the response time to decrease as the flow rate increased, because with a faster flow rate the electrochemically-generated species will move out of the cell more rapidly. The experimental results confirmed this expectation up to a flow rate of about 3.8 $\mu$L/min. But when the flow rate was increased above about 3.8 $\mu$L/min, the measured response time increased slightly, and the sensitivity and stability of the electrospray process were reduced.

It should be noted that the overall influence of flow rate on response time was not that strong. Even at the lowest flow rate tested (1.1 $\mu$L/min), the response time was still less than three seconds. At the low flow rates typically used in electrospray processes, the cell design itself helps to keep response time low. With the fast response times achieved with the present invention, it is possible to detect short-lived, electrochemically-generated intermediates.

Detection of Radical Cations of Polycyclic Aromatic Hydrocarbons (PAH's)

Polycyclic aromatic hydrocarbons (PAH's) are a significant environmental concern. Many PAH's, such as benz(a) anthracene and benze(a)pyrene, are strong carcinogens. PAH's are produced in large quantities by both anthropogenic and natural sources. PAH's are found in oil refinery by-products, as well as in burned hydrocarbon fuels. Lower-molecular weight PAH's have usually been analyzed by GC-MS.

However, higher-molecular weight PAH's (those with more than about five fused rings) are difficult or impossible to analyze by GC-MS because of their low volatility. It is not usually feasible to raise the column temperature to try to increase volatility, because these analytes degrade thermally before producing a sufficiently high vapor pressure.

PAH's have been separated by HPLC, and detected by UV absorption. But the sensitivity of a UV detector is significantly lower than the sensitivity of MS, and HPLC is not well suited for analyzing short-lived PAH derivatives. HPLC-particle beam-MS has also been used to analyze PAH's, but such a system still requires substantial analyte volatility for successful MS analysis.

PAH's have not generally been amenable to prior ES/MS techniques, because they are difficult to ionize through acid/base reactions due to their lack of polar substituents (e.g. —$NH_2$, —OH, —$NO_2$, etc.). Where PAH's have been analyzed by prior ES/MS techniques, the sensitivity has been low.

The electrochemical oxidation of a PAH usually begins with the removal of one electron to form a radical cation. The reversibility of this reaction and the stability of the radical cation varies, depending on the structure of the particular PAH molecule.

Under the preferred reaction conditions described above, the following PAH's were studied: anthracene, phenanthrene, pyrene, 9-methylanthracene, 9,10-dimethylanthracene, chrysene, benzo[a]pyrene, 9,10-diphenylanthracene, perylene, and rubrene. The results are shown in Table 2, in which the "Cell On" column refers to an applied potential of +1.5 V versus Ag/$Ag^+$ (0.01M).

TABLE 2

EC/ES/MS Data for Selected PAH's

| Compound | Molecular Weight | $+R_{½(ox)}$ versus SCE (volts) | $M^+\cdot$ Abundance (arbitrary units) Cell Off | Cell On |
|---|---|---|---|---|
| Anthracene | 178 | 1.09 | — | 25,000 |
| Pyrene | 202 | 1.16 | — | — |
| Phenanthrene | 178 | 1.50 | — | 22,000 |
| 9-methyl-anthracene | 192 | 0.96 | — | 40,289 |
| 9,10-dimethyl-anthracene | 206 | 0.87 | — | 653,615 |
| Chrysene | 228 | 1.35 | — | 93,473 |
| Benzo[a]pyrene | 252 | 1.27 | — | 577,557 |
| 9,10-diphenyl-anthracene | 330 | 1.22 | 13,782 | 35,500 |
| Perylene | 252 | 0.85 | 1,500 | 7,000 |
| Rubrene | 532 | 0.77 | 5,100 | 24,500 |

The PAH's were divided into three groups, based on the stability of their radical cations. The first group included anthracene, phenanthrene, and pyrene. The radical cations of this group are extremely reactive, rapidly reacting irreversibly with the solvent or with impurities. These radical cations were therefore not detectable, or were only barely detectable in EC/ES/MS experiments to date.

The second group included 9,10-diphenylanthracene; perylene; and rubrene. The radical cations of this second group are relatively stable. The radical cations of this group can therefore be detected by prior ES/MS techniques, even without an electrochemical cell. But when a potential of +1.5 V was applied, the ion abundance increased 3- to 6-fold. Thus the use of the novel EC/ES/MS technique significantly enhanced the detection sensitivity for those PAH's.

The third group included 9-methylanthracene; 9,10-dimethylanthracene; chrysene; and benzo[a]pyrene. The stability of the radical cations of this group lies between the stabilities of the first and second groups. These radical cations could not be detected (or were only barely detectable) with the electrochemical cell off (i.e., ES/MS alone), but displayed a high abundance of radical cations in the EC/ES/MS spectra with the electrochemical cell on at a potential of +1.5 V. This result demonstrates the ability of EC/ES/MS to analyze PAH's (including carcinogenic benzo [a]pyrene) that are difficult or impossible to analyze by prior ES/MS techniques.

Earlier studies of the mechanism of electrochemical oxidation of PAH's reflected controversy over whether the initial electron transfer step involves one or two electrons. In the present EC/ES/MS study, only singly charged radical cations were observed at +1.5 V versus $Ag/Ag^+$ (0.01M), even though ES/MS can generate and preserve multiply-charged ions.

Determination of Intermediates and Products of the Oxidation of PAH's

An important application of the EC/ES/MS system is in identifying intermediates and reaction products that follow the formation of the initial electron transfer products (e.g., radical ions). Redox reactions can produce a variety of intermediates and final products through complicated reaction pathways. The mechanisms of electrochemical reactions are of wide interest, especially in studies of biological redox systems and in organic electrochemical synthesis. As an example, we report here an EC/ES/MS study of the oxidation of benzo[a]pyrene.

Figure 7:
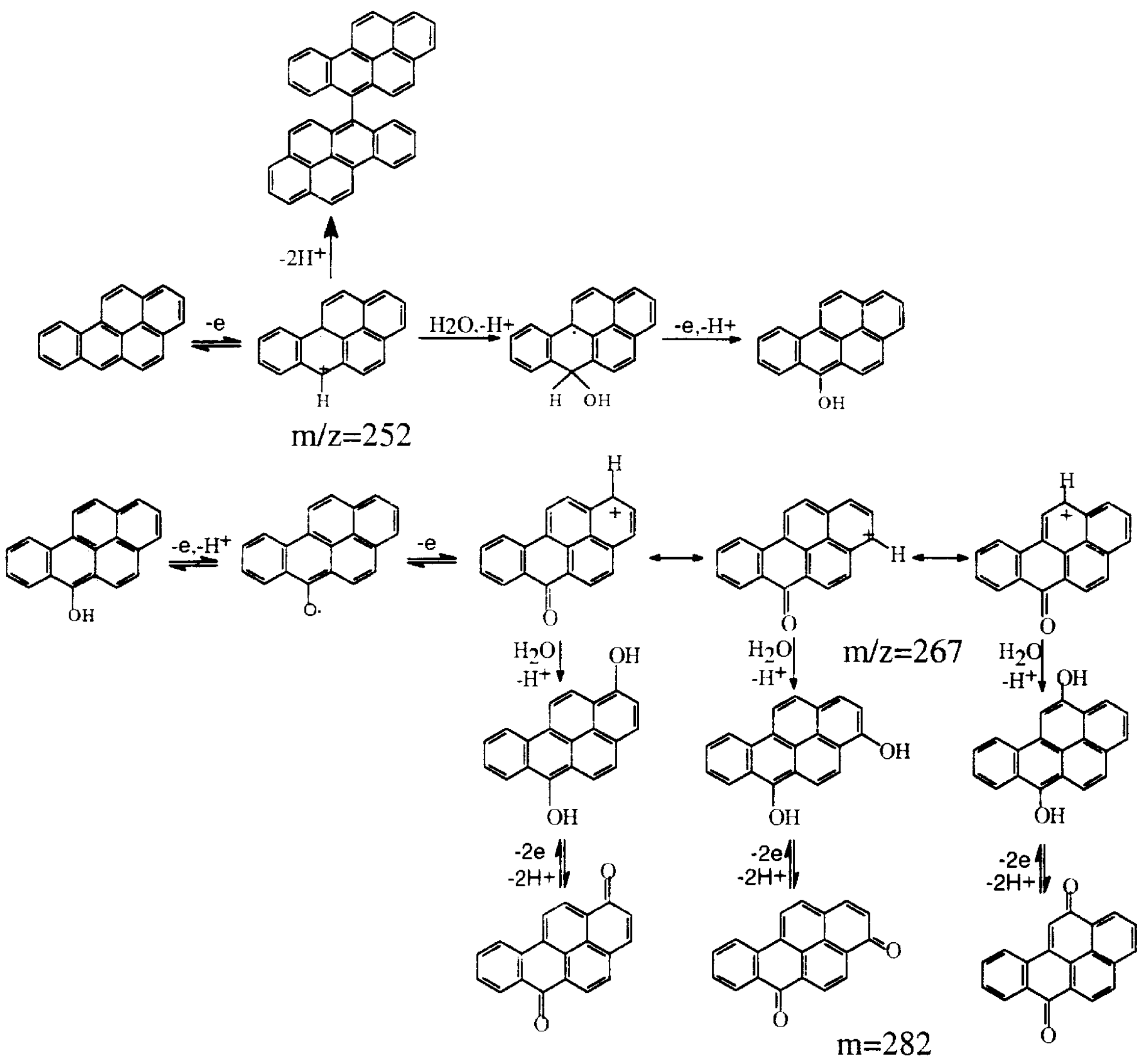
FIG. 7 illustrates a proposed reaction mechanism for the electrochemical oxidation of benzo[a]pyrene.

Benzo[a]pyrene (BaP) is one of the most carcinogenic PAH's. The electrochemical oxidation of BaP has been reported by L. Jeftic et al., J. Am. Chem. Soc., vol. 92, 1332–1337 (1970), who proposed the reaction mechanism illustrated in FIG. 7. Jeftic et al. identified some of the final products, such as BaP dimer and BP-quinones, but could not identify the radical ion intermediates or other ionic intermediates through EPR spectrometry.

Figure 8A:
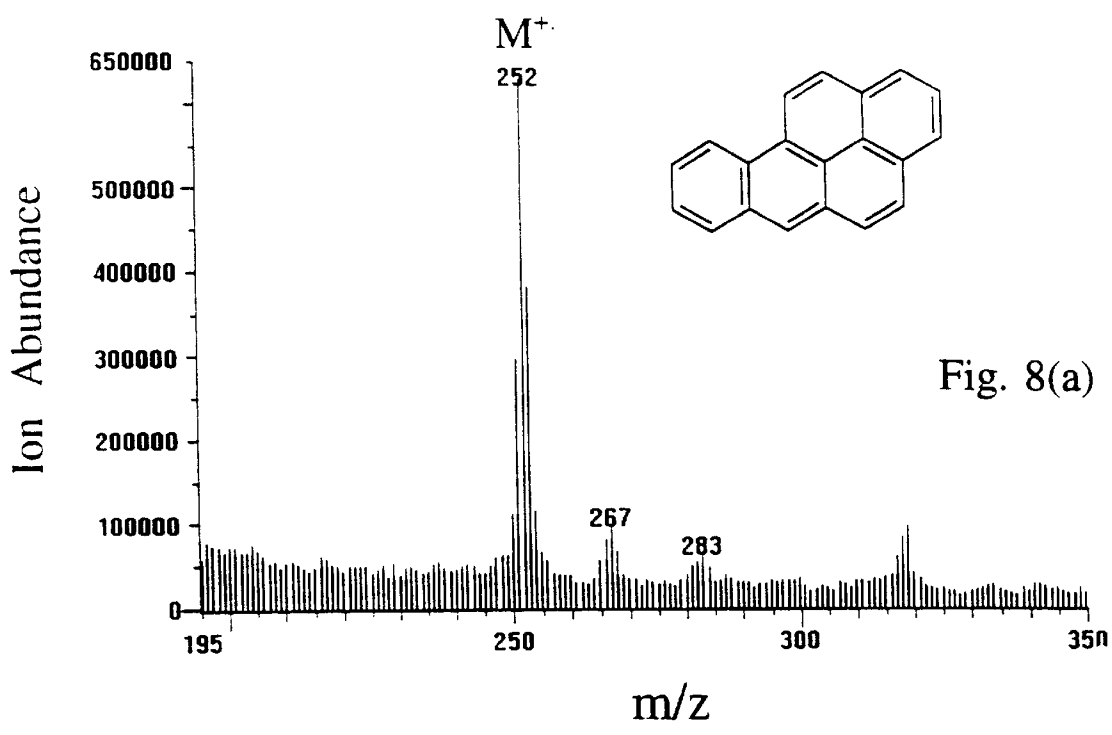
FIGS. 8(*a*) and 8(*b*) illustrate the results of an EC/ES/MS study of the oxidation of benzo[a]pyrene.
Figure 8B:
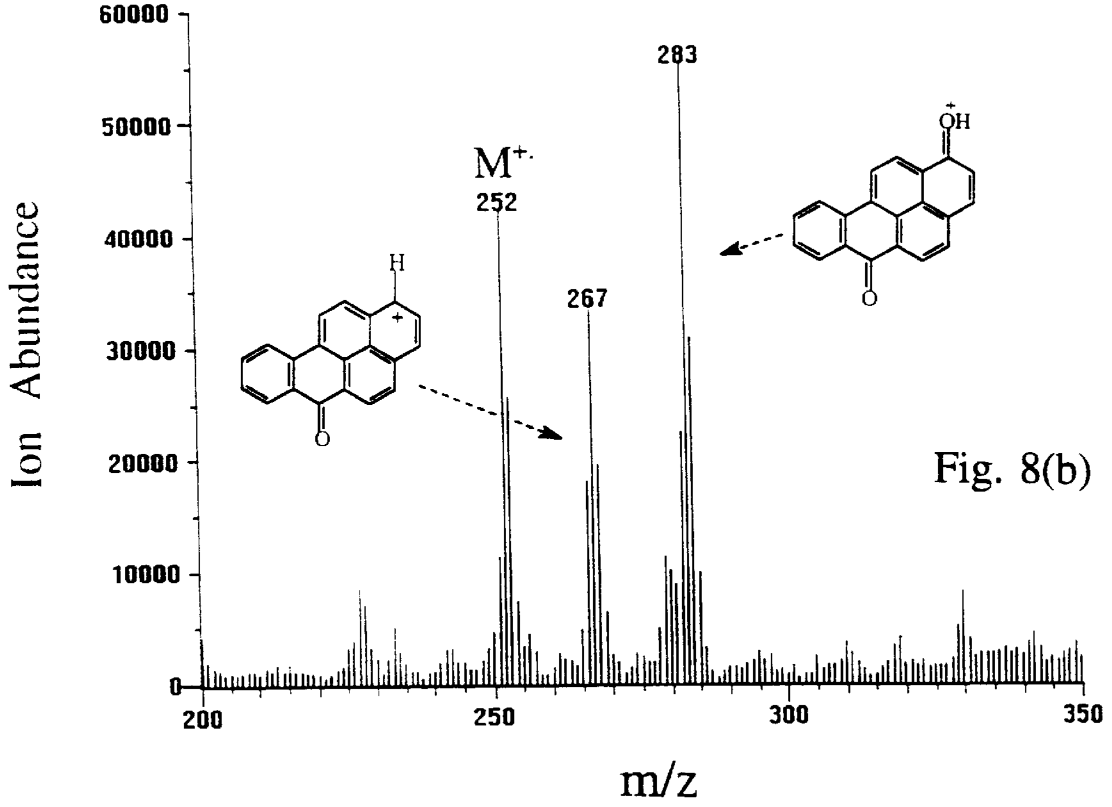

The results of our EC/ES/MS study of BaP are illustrated in FIGS. 8(*a*) and 8(*b*). In anhydrous 95% $CH_2Cl_2$/5% $CH_3CN$ solvent, a high abundance of BaP $M^{+\bullet}$ (m/z=252) was detected at a +1.5 V applied voltage (See FIG. 8(*a*)). When 0.1M $H_2O$ as added to the solution, the abundances of ions at m/z 267 and 283 increased sharply, while the abundance of $M^{+\bullet}$ decreased but was still detectable (See FIG. 8(*b*)).

It was evident that the solvent played an important role in determining the mechanism of the electrochemical reactions. Adding a small amount of water altered the solution chemical and electrochemical reactions, leading to the formation of the ionic intermediate 6-oxobenzo[a]pyrene cation (m/z=267), and to the formation of final products 1,6-benzo[a]pyrene quinone; 3,6-benzo[a]pyrene quinone; and 6,12-benzo[a]pyrene quinone (m=282 Da), which were easily detected by EC/ES/MS as protonated species (m/z=283). (The conventional mass spectrometers used in these experiments cannot distinguish between the different species having the same m/z=283.) Note that 6-oxobenzo[a]pyrene is not a radical cation. Therefore, it would not have been detected by conventional EPR spectrometry, but was readily detected and identified by the novel EC/ES/MS system. This example demonstrates the usefulness of EC/ES/MS as a tool for identifying electrochemical intermediates and reaction products that are themselves either ionic or polar. But where an intermediate or a product is a nonpolar neutral species (e.g., a neutral radical), it cannot be detected by ES/MS techniques unless an adduct ion is formed via attachment to an ionic species. Hence, the EC/ES/MS technique should be viewed as complementary to techniques such as EC/EPR.

Oxidation of Organometallic Compounds

Some neutral organometallic compounds, such as ferrocene and some substituted ferrocenes, can be analyzed by prior electrospray mass spectrometry techniques. However, the sensitivity of such analyses is significantly lower than the sensitivities obtainable with the novel EC/ES/MS system, particularly for organometallic compounds having higher oxidation potentials.

Figure 9A:
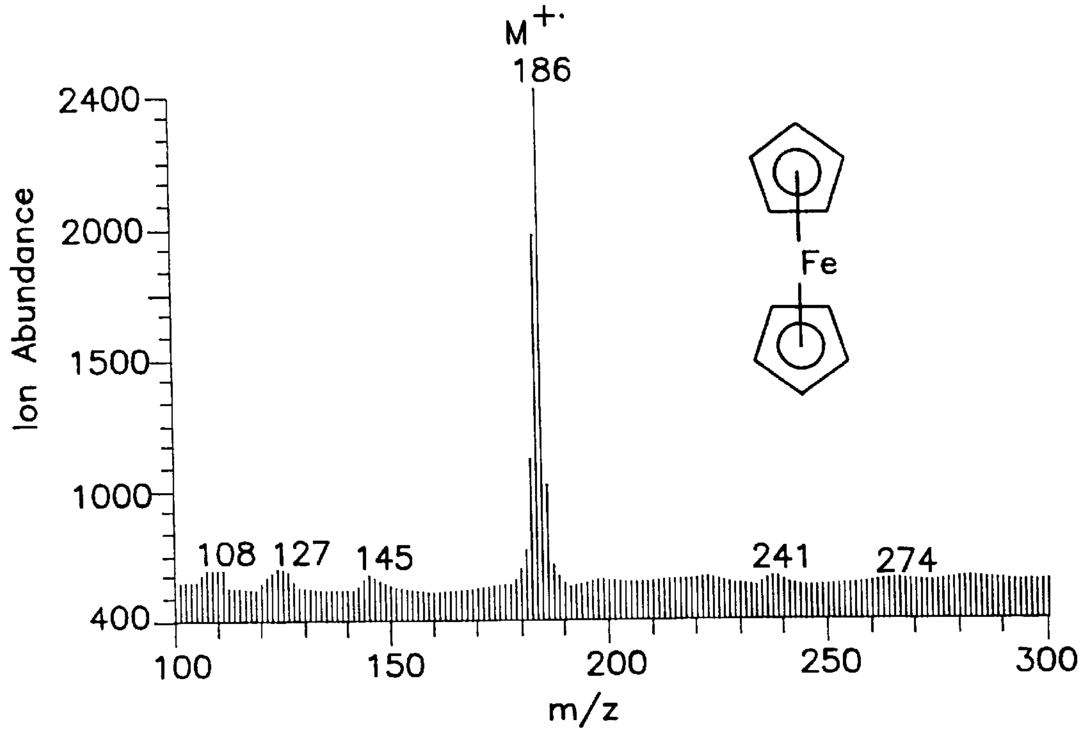
FIGS. 9(*a*) and 9(*b*) illustrate the results of an EC/ES/MS study of the oxidation of ferrocene.
Figure 9B:
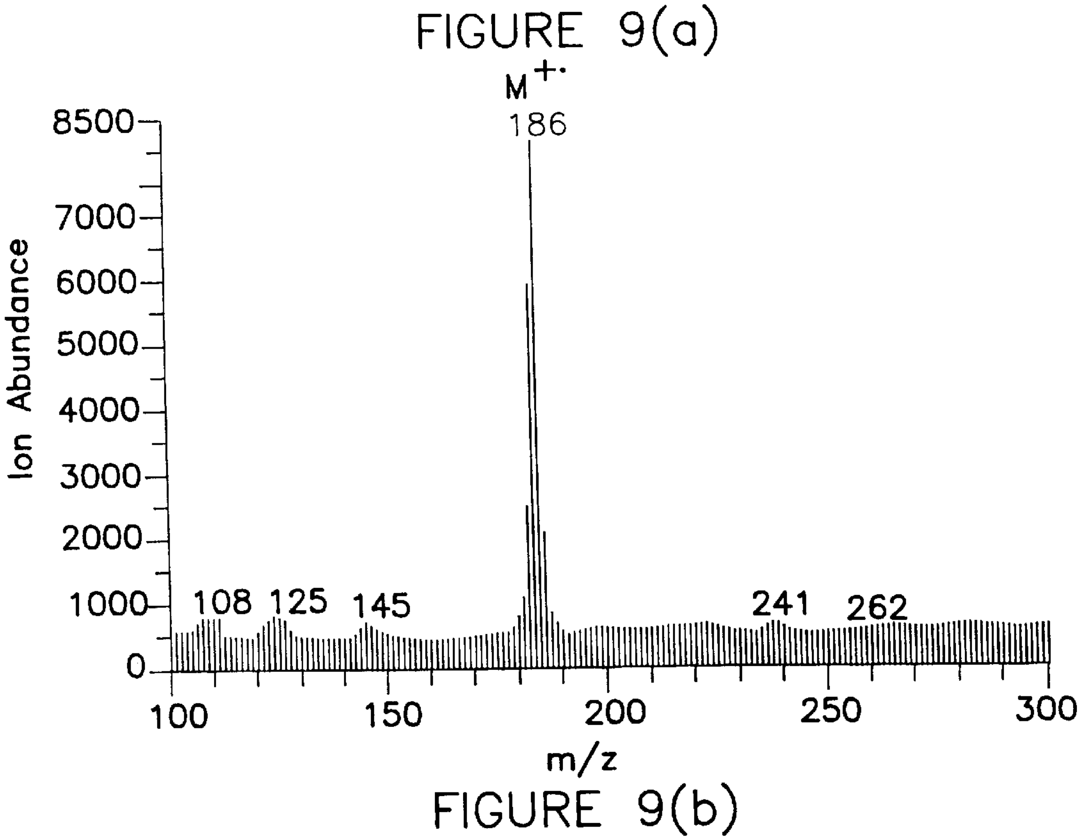

FIGS. 9(*a*) and 9(*b*) depict the results of an EC/ES/MS analysis of ferrocene. In FIG. 9(*a*), the electrochemical cell was off. In FIG. 9(*b*), an oxidation potential of +1.2 V (vs. $Ag/Ag^+$) was applied to the working electrode. With the applied voltage on, the observed abundance of the molecular ion (m/z=186) increased by a factor of more than three.

Similar results were observed for 1,1'-diacetylferrocene and ruthenocene (data not shown). These results demonstrate that EC/ES/MS can significantly increase the sensitivity of the analysis of neutral organometallic compounds.

Linear Voltammetry—Electrospray Mass Spectrometry. Linear voltammetry is a widely used technique in electrochemical studies. In linear voltammetry, the electrochemical reaction current is monitored as a function of a linearly increasing electrode potential. The current-potential relationship can be obtained faster and in a more informative way by linear voltammetry than by a potential step approach. Combining linear voltammetry with ES/MS offers a new tool for studying complex electrochemical reactions.

As examples, we have performed on-line linear voltammetry-electrospray mass spectrometric investigations of pyridine addition to 9,10-diphenylanthracene (DPA), and the anodic oxidation of diphenyl sulfide.

Chemicals. Lithium trifluoroin ethylsulfonate, purchased from Fluka Chemical Co. (Ronkonkoma, N.Y.) was dried in small quantities (100 mg) at 110° C. for 3 hrs before use. DPA and diphenyl sulfide purchased from Sigma Chemical Co. (St. Louis, Mo.) were used without further purification. Methylene chloride purchased from J. T. Baker (Philipsburg, N.J.) was dried by passage through an activated alumina column, and was then stored over alumina until used. Acetonitrile was dried over calcium hydride (Strem Chemical, Newburyport, Mass.) for 24 hrs, and was then distilled over phosphorus pentoxide. The distilled acetonitrile was stored over $CaH_2$ in a desiccator.

Electrochemical devices. An amperometric detector-controller (model LC-4B) and a cyclic voltammetry function generator (model CV-1B) (both purchased from Bioanalytical Systems, Lafayette, Ind.) were modified to carry out linear voltammetry measurements. The combination was used to apply a linearly-changing potential to the working electrode of the three-electrode electrochemical cell described above, and to monitor the resulting reaction current generated from the working electrode. The potential scan limits were from −1.85 to +1.85 V. The AC electric power was replaced by DC rechargeable batteries, simplifying the on-line coupling of the electrochemical device to the electrospray mass spectrometer.

Optimization of experimental conditions. In on-line linear voltammetry-ES/MS, one measures ion abundance versus potential for different mass-analyzed ionic reaction intermediates and ionic final products. In other words, the mass spectral signal intensities of generated or consumed ionic species are monitored as a function of electrode potential. The scanning potential preferably changes gradually (5 mV/s in the studies reported here). The electrochemical reaction rate and the electrospray current then also change gradually in response. These gradually changing conditions offer a better way to maintain stable electrospray ionization conditions than do potential step experiments. In a potential step experiment, a relatively large change in the applied potential can cause abrupt changes in electrospray conditions, which can perturb an otherwise stable electrospray MS signal.

Electrochemically-induced pyridine addition to DPA, and anodic oxidation of diphenyl sulfide have previously been studied in acetonitrile media. Because radical cations are formed in these reactions, methylene chloride was considered to be a better solvent for this study. As noted previously, the low nucleophilicity of methylene chloride helps stabilize radical cations. Increased stability of the radical cations increases the number that survive to arrive at the detector. The high volatility of methylene chloride also assists, because it allows ES/MS at lower temperatures.

Unlike many other types of electrochemical measurements, ES/MS requires a low concentration of supporting electrolytes to achieve high detection sensitivity. It has been reported that lithium trifluoromethylsulfonate, $LiCF_3SO_3$, causes limited suppression of analyte ES/MS signals (F. Zhou et al., "Electrochemically-Enhanced Electrospray Ionization-Mass Spectroscopy," Proceedings of 42nd ASMS Conference on Mass Spectroscopy (May 31–Jun. 5, 1994)), while tetrabutylammonium perchlorate (TBAP) causes severe decreases in analyte signals. Because $LiCF_3SO_3$ is not soluble in pure methylene chloride, it was first dissolved in acetonitrile, which was then diluted with methylene chloride. The supporting electrolyte used in this study was $2\times10^{-4}$M $LiCF_3SO_3$ dissolved in 5% $CH_3CN$/95% $CH_2Cl_2$.

During the course of experiments, the platinum working electrode often coated quickly with anodic oxidation products, causing surface activity to decrease substantially. To maintain both the efficiency of electrode activity and the reproducibility of results, the electrode was electrochemically reactivated by dipping into the electrolyte solution between runs and applying alternating positive and negative potentials (±0.6 V vs $Ag/Ag^+$ electrode, each for 0.5 min) for a total duration of about 5 min.

Pyridine addition to 9,10-diphenylanthracene. Several studies have been conducted on the mechanism of nucleophilic addition of pyridine to the electrochemically-generated 9,10-diphenylanthracene (DPA) cation radical. Two reaction schemes have been proposed: the "half-regeneration" mechanism (illustrated in FIG. 10(*a*)), and the "disproportionation" mechanism (illustrated in FIG. 10(*b*)). See H. Blount, "The anodic pyridation of 9,10-diphenylanthracene in acetonitrile: the spectroelectrochemical view", *J. Electroanal. Chem.* vol. 42, pp. 271–174 (1973); and L. Marcoux, "Anodic substitution: An alternative to the ECE Mechanism" *J. Am. Chem. Soc.*, vol. 93, pp. 537–539 (1971).

Figure 11A:
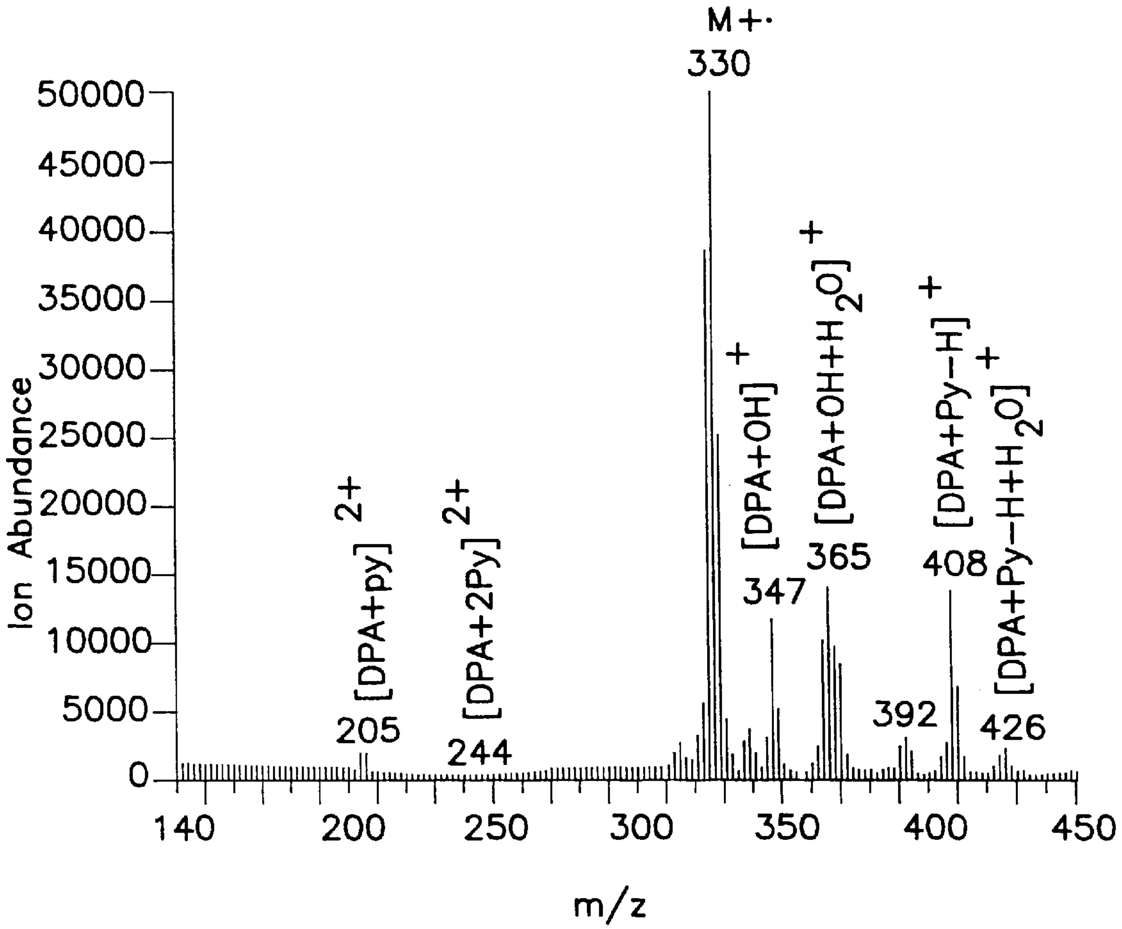
FIGS. 11(*a*) and 11(*b*) illustrate the observed mass spectra of reaction intermediates and products for the addition of pyridine addition to DPA at different concentrations of pyridine.
Figure 11B:
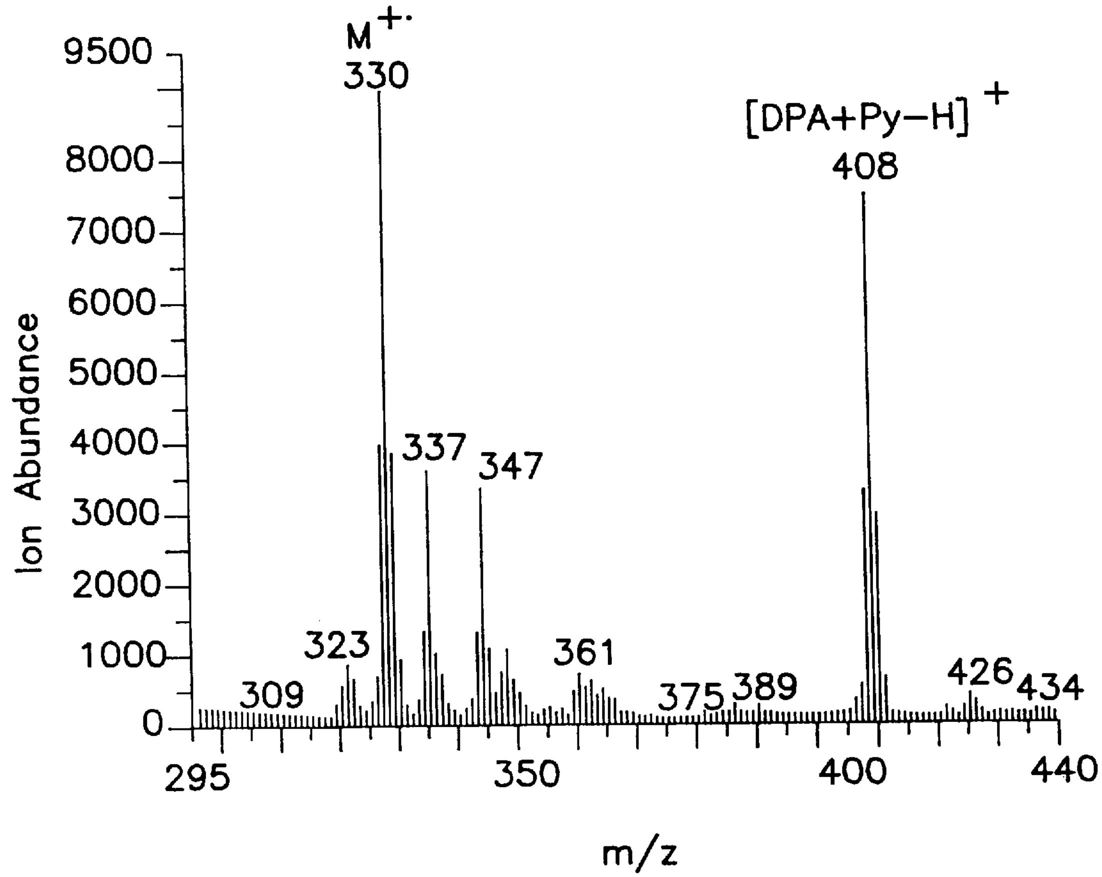
Figure 12A:
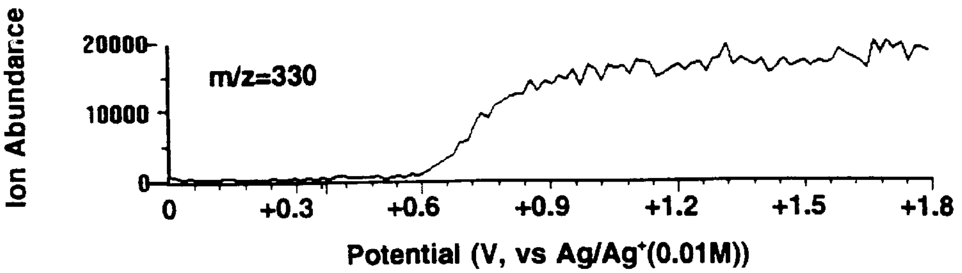
FIGS. 12(*a*) through 12(*f*) illustrate the FS/MS signals for intermediates and products for pyridine addition to DPA as a function of electric potential.
Figure 12B:
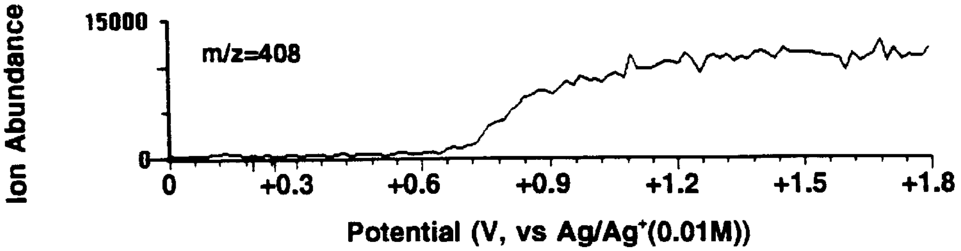
Figure 12C:
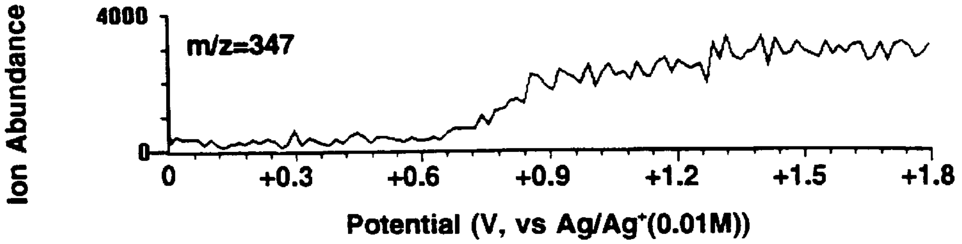
Figure 12D:
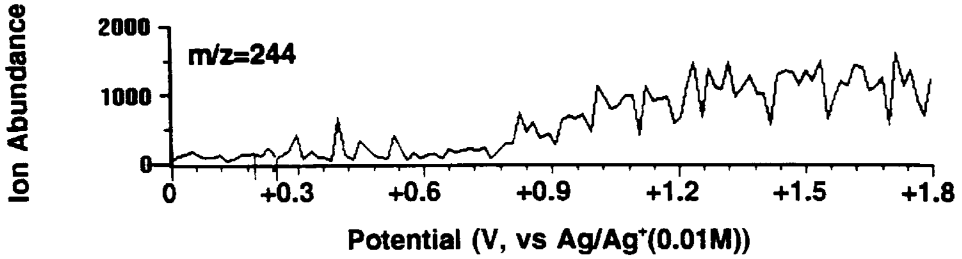
Figure 12E:
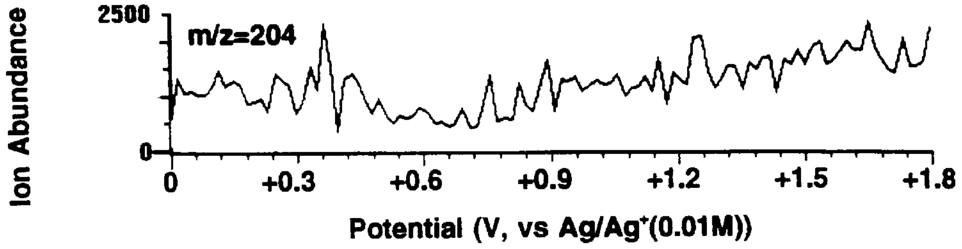
Figure 12F:
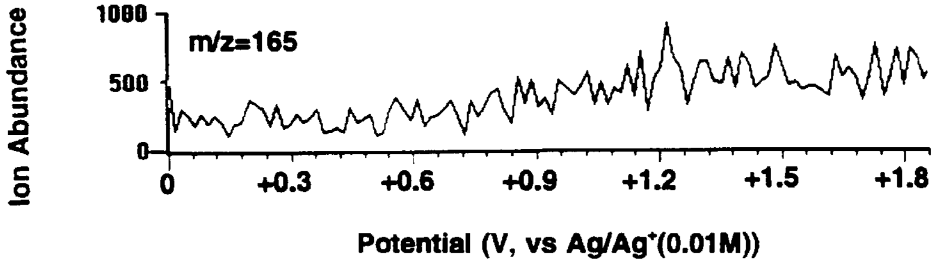

We observed the addition of pyridine addition to DPA with the EC/ES/MS system described above. A potential step of +1.5 V was applied to an electrolyte solution containing $10^{-4}$M DPA with 0.1% (v/v) pyridine, $2\times10^{-4}$M $LiCF_3SO_3$, 5% $CH_3CN$/95% $CH_2Cl_2$, anodic potential 1.5 V, ES voltage: 2.48 kV; MS scan rate: 0.1 s/scan. FIG. 11(*a*) illustrates the observed mass spectrum of the reaction intermediates and products. Assignments for the observed ions are indicated in FIG. 11(*a*), except for m/z=337, which corresponds to $[DPA+Li]^+$.

The same reaction was also studied at the higher pyridine concentration of 0.5% (v/v), linear sweep rate 5 mV/s. FIG. 11(*b*) shows the resulting mass spectrum of anodic oxidation reaction intermediates and final products obtained during linear voltammetry-ES/MS of DPA at this higher pyridine concentration. (Other experimental conditions were the same as those for FIG. 11(*a*)). The assignments of the ions are the same as those given in FIG. 11(*a*). Many of the major reaction intermediates and products in the reaction mechanisms of FIGS. 10(*a*) and 10(*b*) were observed in the mass spectra of FIGS. 11(*a*) and 11(*b*). Notably absent, however, was a peak corresponding to $DPA^{2+}$ (m/z=165—see FIG. 10(*b*)). $DPA(py)^{+\bullet}$ (m/z=409—see FIG. 10(*a*)) appeared to be present primarily as a $^{13}C$ isotope peak of m/z=408, seen at low resolution.

FIGS. 11(*a*) and 11(*b*) allow the comparison of ES/MS signal intensities of the DPA radical cation (m/z=330) and $[DPA(py)–H]^+$ (m/z=408) at low and high pyridine concentrations. At the higher pyridine concentration depicted in FIG. 11(*b*), the ratio of intensities of $[DPA(py)–H]^+$ versus DPA radical cation, i.e. the ratio of intensities of m/z=408 versus m/z=330, increased compared to that observed at the lower pyridine concentration of FIG. 11(*a*). The higher ratio is believed to result from increased consumption of DPA radical by pyridine, with the subsequent appearance of more $[DPA(py)–H]^+$ than was seen with the lower concentration of pyridine.

Both reaction pathways in FIG. 10 include the production of DPA radical cation (m/z=330) in an initial step. The high ES/MS abundance of m/z=330 in both FIGS. 11(*a*) and 11(*b*) shows that this radical cation was relatively stable in the electrolyte solutions used. As seen in FIG. 12(*a*), the DPA radical cation began to appear at a potential of about +0.6 V. Its abundance gradually increased with increasing potential, and leveled off to a relatively steady value after about +0.9 V. The anodic potential halfway to the "limiting current" was approximately +0.75 V, in agreement with the reported value of +0.73 V. (See V. Parker, "Anode potential controlled mechanism of oxidation of 9,10-dimethylanthracene," *J. Chem. Soc. Chem. Comm.*, pp. 848–849 (1969).) As shown in FIGS. 12(*b*) through 12(*e*), the ES/MS signals for pyridine addition and other products appeared at slightly more positive potentials, indicating the occurrence of other electrochemical reactions after the $DPA^{+\bullet}$ production.

Under the "half-regeneration" mechanism, pyridine addition to the DPA radical cation should produce a radical cation of m/z=409. However, the major product from reaction of the DPA radical cation with pyridine, seen in both FIGS. 11(*a*) and 11(*b*), instead had m/z=408, which could indicate the singly charged ion $[DPA(py)–H]^+$ produced by further oxidation of the radical cation $DPA(py)^{+\bullet}$ (m/z 409) at a slightly more positive potential, with the concerted removal of one proton. This reaction has not previously been suggested for pyridine addition to DPA radical cation. A somewhat similar reaction scheme has been observed, however, for acetonitrile addition to anthracene. See M. Baizer et al. (eds.) *Organic Electrochemistry*, chapter 23 (1983). In the latter reaction, anthracene was first oxidized to anthracene radical cation, followed by addition of acetonitrile to the radical cation to produce an anthracene-acetonitrile radical cation with a carbon-nitrogen single bond between the acetonitrile and the anthracene. The acetonitrile-anthracene radical cation was further oxidized (a one electron removal) with the loss of a proton to form the acetonitrile-anthracene cation (appearing at one mass unit less than the corresponding radical cation). For addition of pyridine to the DPA radical cation, we propose that a carbon-nitrogen single bond is formed in an analogous manner between pyridine and DPA. $[DPA(py)–H]^+$ (m/z=408) may then be formed from $DPA(py)^{+\bullet}$ (m/z=409) by oxidation accompanied by the loss of a proton. In these reactions, a nucleophilic lone electron pair (located on the nitrogen of the acetonitrile or pyridine) attacks the polycyclic aromatic hydrocarbon radical cation.

The doubly charged $DPA(py)^{2+}$ (m/z=204.5) observed in FIG. 11(*a*) may be formed either by oxidation of $DPA(py)^{+\bullet}$ (m/z=409) through the mechanism of FIG. 10(*a*), or by pyridine addition to $DPA^{2+}$ (m/z=165) through the mechanism of FIG. 10(*b*). It was difficult to distinguish between these reaction pathways because neither intermediate (m/z=409 or m/z=165) gave a distinct MS signal. However, we did observe another doubly charged reaction product, formed the addition of another pyridine molecule to $DPA(py)^{2+}$ (m/z=204.5) to yield $DPA(py)_2^{2+}$ (m/z=244). The relatively high abundance of $[DPA(py)-H]^+$ (m/z=408), and the apparent absence of a peak corresponding to $DPA^{2+}$ (m/z=165) suggests that the "half-regeneration" mechanism may be the favored route.

Figure 13A:
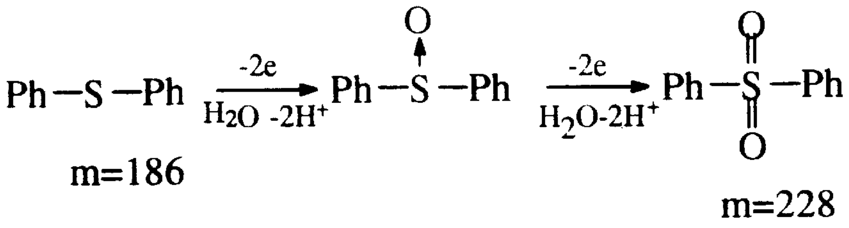
FIGS. 13(*a*) through 13(*c*) illustrate alternative reaction routes for the anodic oxidation of diphenyl sulfide.
Figure 13B:
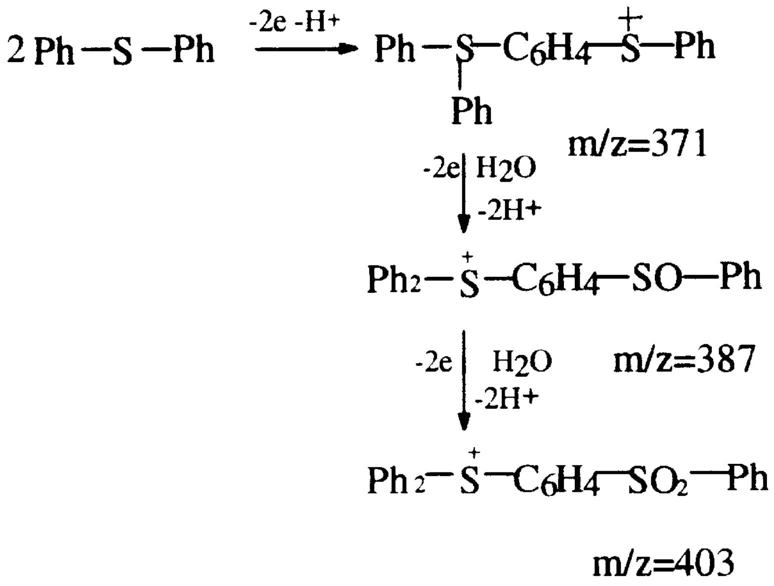
Figure 13C:
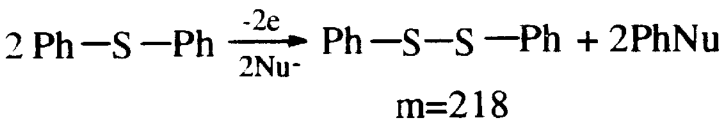

Anodic oxidation of diphenyl sulfide. Previous studies of the anodic oxidation of diphenyl sulfide in acetonitrile (containing trace amounts of water) reported products including sulfoxides, sulfones, pseudodimer sulfonium salts, and disulfides. See M. Baizer et al. (eds.), *Organic Electrochemistry,* Chapter 17 (1983). Formation of the diphenyl sulfide radical cation $[Ph\text{-}S\text{-}Ph]^{+\bullet}$ (m/z=186) has been suggested as the first step in the anodic oxidation process. See K. Uneyama et al., "A novel anodic synthesis of sulfonium salt from diphenyl sulfide," *J. Org. Chem.,* vol. 37, pp. 367–369 (1972). This radical cation is not stable, and reacts further to produce first diphenyl sulfoxide, and then diphenyl sulfone (m=228 Da) as depicted in FIG. 13(*a*). Alternatively, the pseudodimer sulfonium ion (m/z=371) may be produced along with other products as shown in FIG. 13(*b*). Diphenyl disulfide has also been reported to be an oxidation product in the presence of a nucleophile ($Nu^-$), as illustrated in FIG. 13(*c*).

Figure 14:
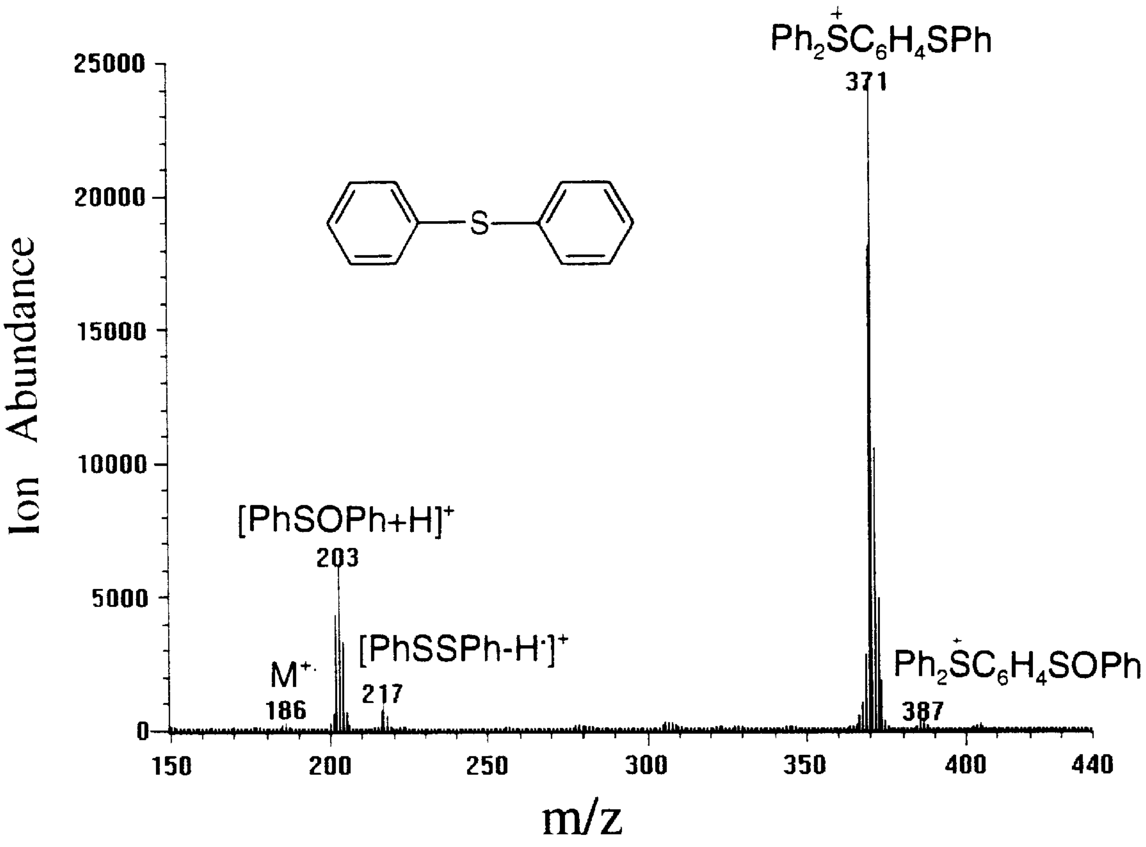
FIG. 14 illustrates the averaged observed mass spectrum for the anodic oxidation of diphenyl sulfide over the potential range +1.50 to +1.75 V in on-line linear voltammetry-ES/MS.
Figure 15A:
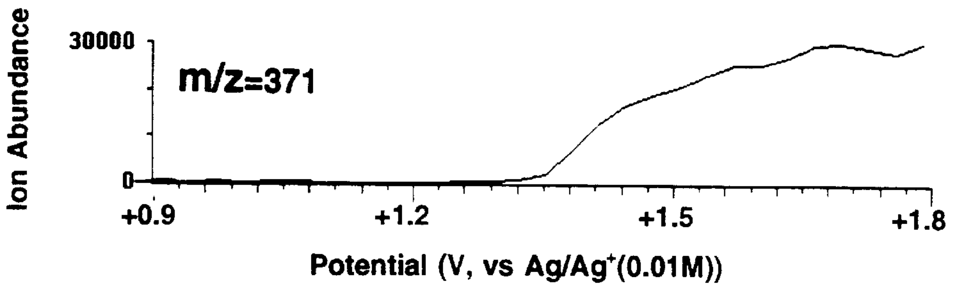
FIGS. 15(*a*) through 15(*d*) illustrate ion abundances versus potential profiles for individual reaction intermediates and products of diphenyl sulfide anodic oxidation.
Figure 15B:
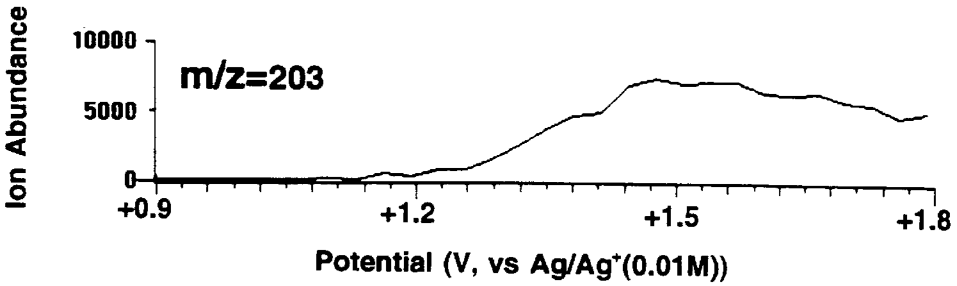
Figure 15C:
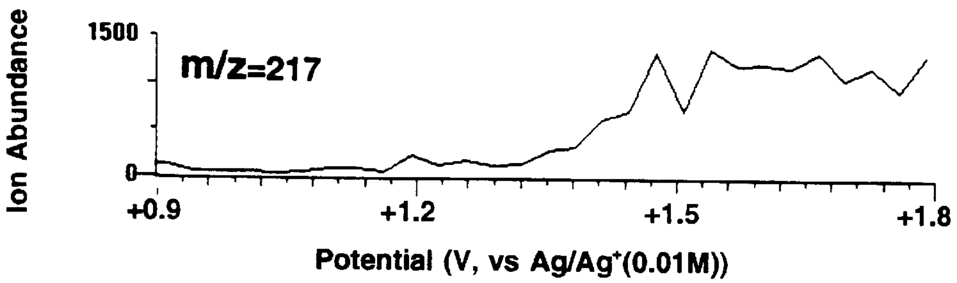
Figure 15D:
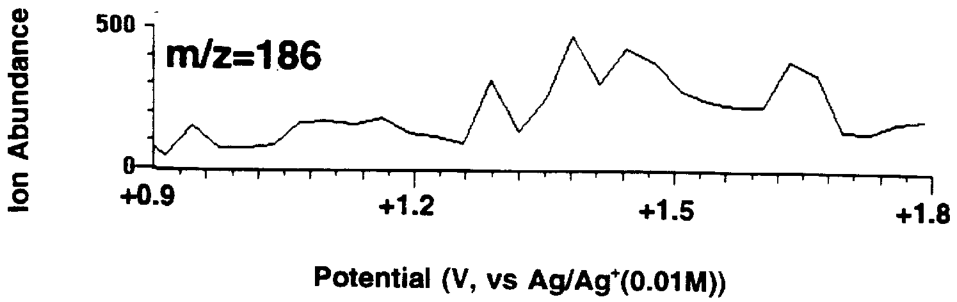

We have investigated the anodic oxidation of diphenyl sulfide by on-line linear voltammetry-ES/MS. FIG. 14 illustrates the averaged mass spectrum over the potential range +1.50 to +1.75 V, depicting several anodic oxidation products whose assignments are given in FIG. 14. Experimental conditions: sample concentration: $10^{-4}$M diphenyl sulfide in $2\times10^{-4}$M $LiCF_3SO_3$, 5% $CH_3CN$/95% $CH_2Cl_2$, linear sweep rate 5 mV/s, ES voltage 2.48 kV, MS scan rate 0.1 s/scan. FIGS. 15(*a*) through (*d*) illustrate the ion abundance versus potential profiles of individual reaction intermediates and products for diphenyl sulfide anodic oxidation in methylene chloride (experimental conditions the same as for FIG. 14), including m/z=371 (pseudodimer sulfonium ion $[Ph_2\text{-}S\text{-}C_6H_4\text{-}S\text{-}Ph]^+$); m/z=203 ($[Ph\text{-}S(OH)\text{-}Ph]^+$); m/z=217 (possibly $[Ph\text{-}S\text{-}S\text{-}Ph\text{-} H]^+$); and m/z 186 (radical cation of diphenyl sulfide $[Ph\text{-}S\text{-}Ph]^{+\bullet}$).

The ion abundance versus potential diagrams of FIG. 15 show that below about +1.2 V none of these species were detected in significant amounts. Ion abundances for both $[Ph\text{-}S\text{-}Ph]^{+\bullet}$ (m/z=186) and $[Ph\text{-}S(OH)\text{-}Ph]^+$ (m/z=203) increased above a potential of about +1.23 V. This value is close to the value previously reported (+1.26 V) for diphenyl sulfoxide formation from diphenyl sulfide oxidation, suggesting that m/z=203 corresponds to a protonated diphenyl sulfoxide molecule. See P. Cottrell et al., "Electrochemical oxidation of aliphatic sulfides under nonaqueous conditions" *J. Electrochem. Soc.,* vol. 116, pp. 1499–1503 (1969). The ES/MS signal intensity for m/z=186 was relatively small compared to the other assigned ion signals in FIGS. 14 and 15, suggesting that this intermediate was relatively unstable.

Subsequent reaction of the diphenyl sulfide radical cation can lead to diphenyl sulfoxide (FIG. 13(*a*), center structure). Protonated diphenyl sulfoxide, $[Ph\text{-}S(OH)\text{-}Ph]^+$ (m/z=203), was a major component detected, as shown in both FIGS. 14 and 15. The water required to produce diphenyl sulfoxide from electrooxidation of diphenyl sulfide could originate from low levels of water in the distilled organic solvents, or even from moisture in the air. (The electrochemical cell was not isolated from the atmosphere.) No ES/MS signal corresponding to the sulfone product (m=228, FIG. 13(*a*)) was observed. The reason for this absence could be as simple as the fact that the potential may not have been scanned to a high enough positive voltage to initiate this reaction.

At about 1.35 V, a signal for the pseudodimer sulfonium ion appeared (m/z=371, FIG. 15(*a*)); this signal continued to increase with increasing potential. The ES/MS signal corresponding to the pseudodimer sulfoxide ion (m/z=387) did not appear until the potential was greater than about +1.68 V (not shown), indicating that under these conditions the pseudodimer sulfoxide ion was more difficult to generate electrochemically than either the diphenyl sulfide radical cation or the pseudodimer sulfonium ion. In the presence of trace levels of water, the pseudodimer sulfoxide ion (m/z=387) could be produced from the oxidation of pseudodimer sulfonium ion (m/z=371), as shown in FIG. 13(*b*).

Diphenyl disulfides (Ph-S-S-Ph) have been reported to be generated electrochemically by cleavage of the S-phenyl bond of diphenyl sulfide (M. Baizer et al., Chapter 17). However, we observed ES/MS signals neither for protonated Ph-S-S-Ph (m/z=219), nor for Ph-S-S-Ph radical cation (m/z=218). Instead, an ion of m/z 217 was observed (FIGS. 14 and 15(*c*)). This ion could be produced by the removal of two electrons and a proton from diphenyl disulfide, possibly in concert with cleavage of the S-phenyl bond.

Results such as those reported above demonstrate that on-line linear voltammetry-electrospray mass spectrometry permits the monitoring of numerous electrochemical intermediates and products as a function of applied potential; and that the technique thus offers a useful tool for studying complex electrochemical reactions and mechanisms.

Although the specific examples reported above all involved the production of cations via electrochemical oxidation, the same techniques may readily be used in the generation of anions via electrochemical reduction. For either oxidation or reduction, a variety of applied potential techniques may be used—e.g., potential steps (incremental steps in applied voltage), linear sweep (linear changes in voltage), cyclic voltammetry (repetitive ascending linear sweeps followed by descending linear sweeps back to the original potential), coulometry, etc.

By replacing the mass spectrometer with a suitable substrate, a device as otherwise described in this specification could also be used as a means for deposition of electrochemical reaction products. To enable deposition, potentials of roughly the same magnitude as described above are applied to the EC device, while the substrate is held at or near ground potential. The substrate could itself be conducting, or it could be coated onto a conducting material.

The entire disclosures of all references cited in the specification are hereby incorporated by reference in their entirety, as is the complete disclosure of the following abstract (which is not prior art to this application): X. Xu et al., "On-Line Electrochemistry/Electrospray Mass Spectrometry: Studies of Oxidation of Polycyclic Aromatic Hydrocarbons (PAHs)," Proceedings of 43rd ASMS Conference on Mass Spectroscopy, p. 254 (May 1995). In the event of an otherwise irresolvable conflict, however, the present specification shall control.

We claim:

1. An apparatus for delivering ions to a mass spectrometer, said apparatus comprising:

(a) an inlet for receiving a sample in solution;

(b) an outlet for releasing droplets bearing ions generated from the sample to the mass spectrometer;

(c) a working electrode capable of creating a redox potential in the solution, to cause one or more electrochemical reactions that generate ions from the sample; wherein said working electrode does not generate an electric field between the apparatus and the mass spectrometer sufficient to cause electrospray release of droplets; wherein said working electrode contacts the solution only within said outlet or within 2 mm of said outlet; whereby the electrochemical reactions caused by the working electrode-created redox potential occur substantially within or immediately adjacent said outlet.

2. An apparatus as recited in claim 1, additionally comprising an auxiliary electrode for creating an electric field between said outlet and the mass spectrometer, to cause the electrospray release of droplets from the sample to the mass spectrometer.

3. An apparatus as recited in claim 2, wherein said auxiliary electrode comprises a hollow cylinder of a conductive material, wherein the interior of the hollow cylinder acts as a capillary to transport the sample.

4. An apparatus as recited in claim 2, wherein said auxiliary electrode comprises a hollow cylinder of a conductive material; wherein the interior of the hollow cylinder acts as a capillary to transport the sample; wherein said working electrode comprises a length that is electrically insulated from the solution; wherein said length is insulated by a surrounding, electrically insulating layer; and wherein said insulated length and said insulating layer are disposed concentrically within the hollow cylinder of said auxiliary electrode.

5. An apparatus as recited in claim 1, additionally comprising a heater to cause the thermospray release of droplets from said outlet.

6. An apparatus as recited in claim 1, additionally comprising a nebulizer to cause the aerospray release of droplets from said outlet.

7. An apparatus as recited in claim 1, wherein said apparatus additionally comprises a reference electrode against which the electric potential of said working electrode may be accurately measured and controlled.

8. An apparatus as recited in claim 1, wherein said working electrode comprises a section of wire exposed to the solution.

9. An apparatus as recited in claim 1, wherein a single, substantially flat surface of said working electrode is exposed to the solution.

10. A mass spectrometer comprising an apparatus as recited in claim 1 interfaced with a mass spectrometer.

11. A method for delivering ions to a mass spectrometer, said method comprising the steps of:

(a) placing a sample in solution into an inlet of an apparatus for delivering ions to a mass spectrometer;

(b) releasing to the mass spectrometer from an outlet of the apparatus droplets bearing ions generated from the sample;

(c) creating a redox potential at a working electrode in the solution, to cause one or more electrochemical reactions that generate ions from the sample; wherein said working electrode does not generate an electric field between the apparatus and the mass spectrometer sufficient to cause electrospray release of droplets; wherein said working electrode contacts the solution only within the outlet or within 2 mm of the outlet; whereby the electrochemical reactions caused by the working electrode-created redox potential occur substantially within or immediately adjacent said outlet.

12. A method as recited in claim 11, additionally comprising the step of creating an electric field between the mass spectrometer and an auxiliary electrode in or adjacent the outlet, to cause the electrospray release of droplets from the sample to the mass spectrometer.

13. A method as recited in claim 12, wherein said auxiliary electrode comprises a hollow cylinder of a conductive material, wherein the interior of the hollow cylinder acts as a capillary to transport the sample.

14. A method as recited in claim 12, wherein said auxiliary electrode comprises a hollow cylinder of a conductive material; wherein the interior of the hollow cylinder acts as a capillary to transport the sample; wherein said working electrode comprises a length that is electrically insulated from the solution; wherein said length is insulated by a surrounding, electrically insulating layer; and wherein said insulated length and said insulating layer are disposed concentrically within the hollow cylinder of said auxiliary electrode.

15. A method as recited in claim 11, additionally comprising the step of heating droplets from the sample to cause the thermospray release of droplets from the outlet.

16. A method as recited in claim 11, additionally comprising the step of nebulizing the sample to cause the aerospray release of droplets from the outlet.

17. A method as recited in claim 11, additionally comprising the step of accurately measuring and controlling the electric potential of the working electrode by comparison with the potential of a reference electrode.

18. A method as recited in claim 11, wherein the working electrode comprises a section of wire exposed to the solution.

19. A method as recited in claim 11, wherein a single, substantially flat surface of the working electrode is exposed to the solution.

20. A method for analyzing a sample, comprising the steps of releasing ions to a mass spectrometer as recited in claim 11, and measuring a mass spectrum of the ions with the mass spectrometer.

21. A method as recited in claim 11, wherein the method is used to analyze ionic or polar intermediates or products generated by the redox potential of the working electrode.

22. A method as recited in claim 21, wherein the sample comprises a nonvolatile, nonpolar compound.

23. A method as recited in claim 22, wherein the sample comprises a polycyclic aromatic compound.

24. A method as recited in claim 22, wherein the time delay between generation of the ions and measuring the mass spectrum of the ions is less than three seconds.

* * * * *